US012583408B2

(12) United States Patent
Amorim Correia et al.

(10) Patent No.: US 12,583,408 B2
(45) Date of Patent: Mar. 24, 2026

(54) STEERING WHEEL WITH AN AIRBAG

(71) Applicants: ZF AUTOMOTIVE SAFETY GERMANY GMBH, Aschaffenburg (DE); SAFELIFE INDUSTRIA DE COMPONENTES DE SEGURANCA AUTOMOVEL LDA, Gemieria (PT); Dalphi Metal España SLU, Vigo (ES)

(72) Inventors: João Duarte Amorim Correia, Viana do Castelo (PT); Johannes Morhart, Großostheim (DE); Bartolomeu Franco, Viana do Castelo (PT)

(73) Assignees: ZF AUTOMOTIVE SAFETY GERMANY GMBH, Aschaffenburg (DE); SAFELIFE INDUSTRIA DE COMPONENTES DE SEGURANCA AUTOMOVEL LDA, Gemieria (PT); Dalphi Metal España SLU, Vigo (ES)

( * ) Notice: Subject to any disclaimer, the term of this patent is extended or adjusted under 35 U.S.C. 154(b) by 0 days.

(21) Appl. No.: 18/687,332

(22) PCT Filed: Aug. 2, 2022

(86) PCT No.: PCT/EP2022/071643
§ 371 (c)(1),
(2) Date: Feb. 28, 2024

(87) PCT Pub. No.: WO2023/030806
PCT Pub. Date: Mar. 9, 2023

(65) Prior Publication Data
US 2025/0121791 A1    Apr. 17, 2025

(30) Foreign Application Priority Data

Sep. 3, 2021    (DE) ......................... 102021122898.0

(51) Int. Cl.
*B60R 21/203* (2006.01)
*B60R 21/2338* (2011.01)
(Continued)

(52) U.S. Cl.
CPC ...... *B60R 21/2035* (2013.01); *B60R 21/2342* (2013.01); *B60R 21/239* (2013.01);
(Continued)

(58) Field of Classification Search
CPC . B60R 21/203; B60R 21/2035; B60R 21/233; B60R 21/2338; B60R 21/2342;
(Continued)

(56) References Cited

U.S. PATENT DOCUMENTS

| | | | |
|---|---|---|---|
| 6,394,489 B1 * | 5/2002 | Faigle | B60R 21/2035 |
| | | | 280/731 |
| 6,676,158 B2 * | 1/2004 | Ishikawa | B60R 21/2346 |
| | | | 280/743.1 |

(Continued)

FOREIGN PATENT DOCUMENTS

| | | | |
|---|---|---|---|
| DE | 19911682 A1 | 9/2000 | |
| DE | 19951029 A1 * | 3/2001 | ....... B60R 21/21656 |

(Continued)

OTHER PUBLICATIONS

Machine translation of JP 2008105623 A, published May 8, 2008, translation obtained Feb. 21, 2025. (Year: 2008).*

(Continued)

*Primary Examiner* — Laura Freedman
(74) *Attorney, Agent, or Firm* — Tarolli, Sundheim, Covell & Tummino LLP

(57) ABSTRACT

A steering wheel (10) includes a steering wheel rim (16) and an airbag module (18) accommodated in a hub region (12) of the steering wheel (10) and comprising an airbag (26), wherein an exit opening of the airbag module (18) is located (Continued)

at a position different from an upper side of the steering wheel (10) and beneath the steering wheel rim (16) and the airbag module (18) is disposed so that the airbag (26) deploys through a clearance (22) between the hub region (12) and the steering wheel rim (16) toward the upper side of the steering wheel (10). The airbag (26) comprises a cushion-type restraint chamber (32) and a connecting chamber (34), wherein the restraint chamber (32) covers, in the completely filled state, the steering wheel rim (16) on the occupant side, while the connecting chamber (34) connects the restraint chamber (32) via an inflation orifice disposed on a rear wall (50) of the restraint chamber (32) to a gas generator accommodated in the airbag module (18), wherein the connecting chamber (34) of the airbag (26) includes at least one vent opening (72) to allow filling gas to flow out of the airbag (26) even before it reaches the restraint chamber (32).

17 Claims, 23 Drawing Sheets

(51) Int. Cl.
B60R 21/2342 (2011.01)
B60R 21/239 (2006.01)

(52) U.S. Cl.
CPC ............... *B60R 2021/23384* (2013.01); *B60R 2021/2395* (2013.01)

(58) Field of Classification Search
CPC ........ B60R 21/239; B60R 2021/23308; B60R 2021/23316; B60R 2021/23324; B60R 2021/23384; B60R 2021/2395
See application file for complete search history.

(56) References Cited

U.S. PATENT DOCUMENTS

| | | | | |
|---|---|---|---|---|
| 6,874,812 B2 * | 4/2005 | Keutz | ................... | B60R 21/203 |
| | | | | 280/730.1 |
| 7,172,213 B2 * | 2/2007 | Kreuzer | ................ | B60R 21/239 |
| | | | | 280/739 |
| 7,607,690 B2 * | 10/2009 | Abe | ....................... | B60R 21/231 |
| | | | | 280/739 |
| 9,050,942 B2 * | 6/2015 | Ishiguro | ................ | B60R 21/239 |
| 9,555,764 B2 * | 1/2017 | Hiruta | ................... | B60R 21/239 |
| 11,377,063 B2 * | 7/2022 | Lind | ................... | B60R 21/2338 |
| 11,427,147 B2 * | 8/2022 | Song | ................... | B60R 21/2176 |
| 11,511,696 B2 * | 11/2022 | Song | ..................... | B60R 21/233 |
| 11,518,333 B2 * | 12/2022 | Song | .................... | B60R 21/216 |
| 11,597,345 B2 * | 3/2023 | Ko | .................... | B60R 21/21656 |
| 11,945,390 B2 * | 4/2024 | Von Roden | ........... | B60R 21/203 |
| 2007/0241546 A1 | 10/2007 | Chida et al. | | |
| 2019/0256034 A1 | 8/2019 | Saito et al. | | |

FOREIGN PATENT DOCUMENTS

| | | | | | |
|---|---|---|---|---|---|
| DE | 10150772 C1 * | 3/2003 | | ........... | B60R 21/203 |
| EP | 1211145 A1 | 6/2002 | | | |
| JP | 10071911 A | * | 3/1998 | ........... | B60R 21/203 |
| JP | 2008105623 A | 5/2008 | | | |
| JP | 2008114721 A | 5/2008 | | | |
| JP | 2012011870 A | * | 1/2012 | | |
| WO | 2005/044643 A1 | 5/2005 | | | |
| WO | 2008/017299 A1 | 2/2008 | | | |
| WO | 2019/048292 A1 | 3/2019 | | | |

OTHER PUBLICATIONS

Machine translation of JP 2012011870 A, published Jan. 19, 2012, translation obtained Feb. 21, 2025. (Year: 2012).*
PCT Search Report for corresponding Intnerational Application Serial No. PCT/EP2022/071643, dated Nov. 3, 2022, pp. 1-6.

* cited by examiner

12 O'Clock Position

9 O'Clock Position

3 O'Clock Position

6 O'Clock Position

Fig. 18
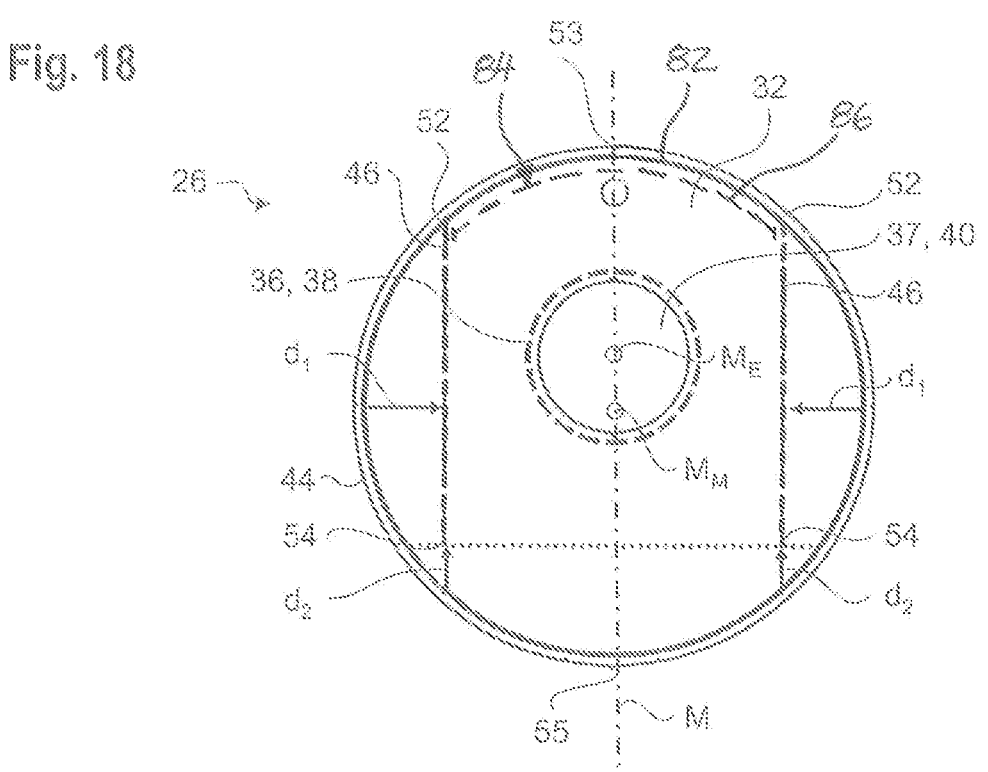
Fig. 19                                              Fig. 20
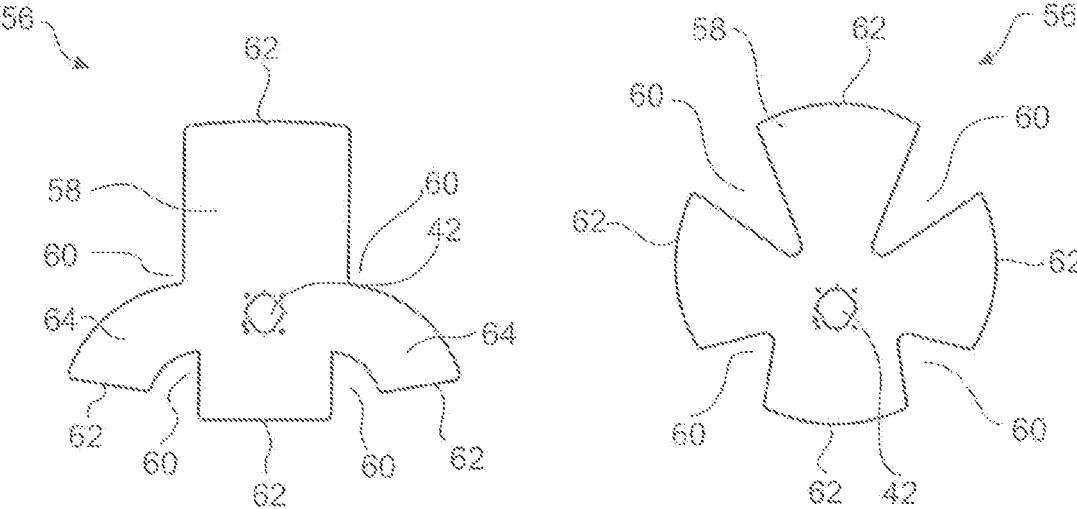

Fig. 26
Fig. 27
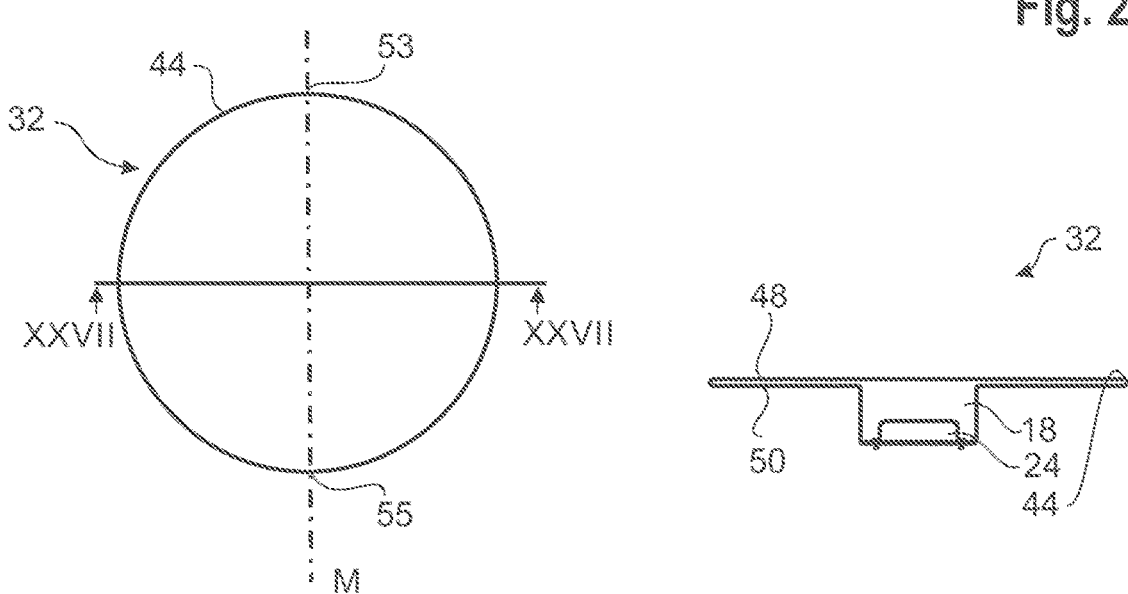
Fig. 28
Fig. 29
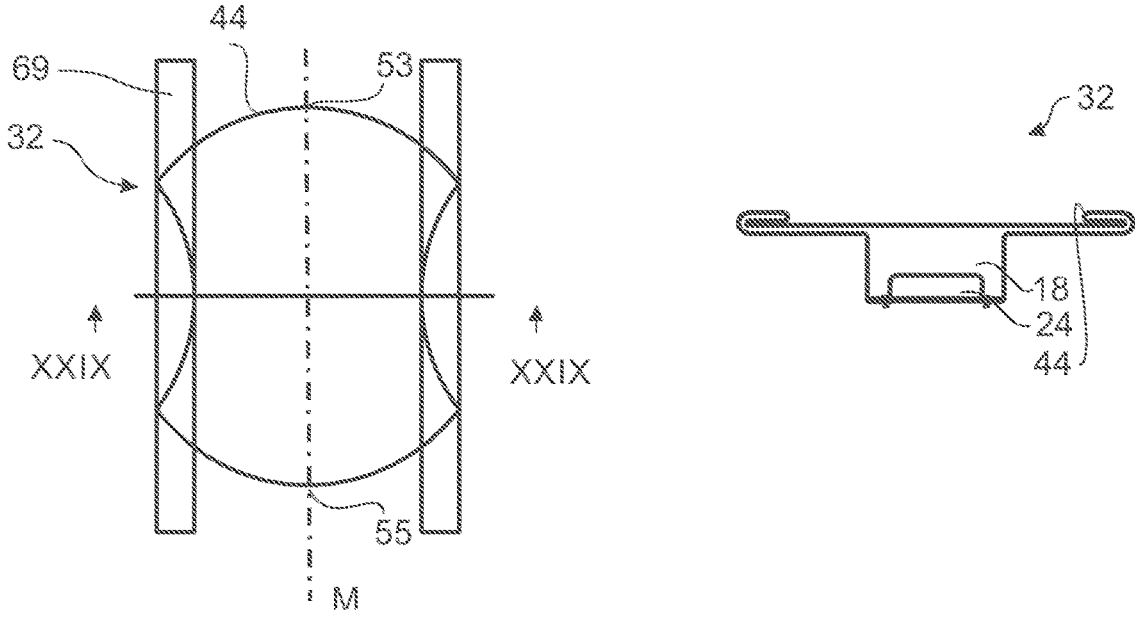

STEERING WHEEL WITH AN AIRBAG

RELATED APPLICATIONS

This application is a U.S. National Stage Application filed under 35 USC 371 claiming priority to Serial No. PCT/EP2022/071643, filed on 2 Aug. 2022; which claims priority from Patent Application 10 2021 122 898.0, filed 3 Sep. 2021, the entireties of which are hereby incorporated herein by reference.

TECHNICAL FIELD

The invention relates to a steering wheel of a vehicle comprising an airbag.

BACKGROUND

The airbag accommodated in the steering wheel, also referred to as driver airbag, protects the vehicle operator from impacting on the steering wheel. Cushion-type airbags bearing on and completely covering the steering wheel rim are used as a standard. The airbag module containing the airbag is inserted in the steering wheel hub.

Conventionally, a door of the airbag module opens on the upper side of the steering wheel so that the airbag exits the steering wheel hub in an exiting direction in parallel to the axis of rotation of the steering wheel. From this point, the airbag can spread unhindered and quickly over the steering wheel rim.

However, in the meantime, electronic devices, frequently including displays, have increasingly be arranged on the upper side of the steering wheel hub. In that case, the conventional type of deployment of the airbag is not useful. Instead, the exit opening of the airbag module is frequently disposed beneath the plane of the steering wheel hub. However, as a result the airbag must pass, during deployment, from the rear side of the steering wheel rim to the front side thereof.

SUMMARY

It is the object of the invention to improve the deployment process of the airbag for an airbag module arranged in this way.

This object is achieved by a steering wheel that includes a steering wheel rim and an airbag module accommodated in a hub region of the steering wheel and comprising an airbag, wherein an exit opening of the airbag module is located at a position different from the upper side of the steering wheel and beneath the steering wheel rim, and the airbag module is arranged so that the airbag deploys through a clearance between the hub region and the steering wheel rim to the upper side of the steering wheel. The airbag includes a cushion-type restraint chamber and a connecting chamber, and the restraint chamber covers, in the completely filled state, the steering wheel rim on the occupant side, while the connecting chamber connects the restraint chamber via an inflation orifice disposed on a rear wall of the restraint chamber to a gas generator accommodated in the airbag module, wherein the connecting chamber of the airbag has at least one vent opening to allow filling gas to flow out of the airbag even before said filling gas flows into the restraint chamber. The at least one vent opening for the outflow of filling gas is disposed preferably beneath the steering wheel rim. Such a vent opening allows the airbag to deploy in a less aggressive manner, thereby a vehicle occupant being strained to a lesser extent during the airbag deployment particularly in so-called "out-of-position" situations, i.e., in an unusual seating position. Positioning of the vent opening beneath the steering wheel rim in the connecting chamber is advantageous, because the outflow can take place, on the one hand, at an early stage and, on the other hand, behind the cushion-type restraint chamber so that the filling gas escaping through the vent opening does not flow against the vehicle occupant.

The connecting chamber preferably includes a closure element for closing the at least one vent opening. Further, a tether may be provided which is connected at one tether end to the closure element and at an opposite tether end to a wall of the airbag, particularly to a front wall of the restraint chamber. In this way, depending on the seating position of the occupant, with little effort an airbag deployment beneficial to the restraining effect and the occupant safety can be adjusted with an opened or closed vent opening.

According to one embodiment of the steering wheel, the connecting chamber takes, in the filled state, a tubular shape that is predetermined by at least one cut part of an outer cover of the connecting chamber. The outer cover of the connecting chamber is preferably made from cut parts adapted to be flatly spread, wherein there are a maximum of two cut parts for the connecting chamber.

The three-dimensional shape of the filled connecting chamber is predetermined by the shape of the cut parts. In this way, the shape of the connecting chamber can be adapted to different types of steering wheels in a simple and low-cost manner. Since the shape of the connecting chamber has a great influence on the positioning of the restraint chamber and the movement thereof from the exit opening through the clearance in the steering wheel rim toward the upper side of the steering wheel rim, a simple option of shaping the connecting chamber also results in a simple and low-cost option to improve the positioning of the restraint chamber.

The connecting chamber has a significantly smaller filling volume than the restraint chamber, for example less than 25% of the volume of the restraint chamber, and develops no restraining effect. Catching and restraining the vehicle occupant is effectuated exclusively by the restraint chamber.

Preferably, the restraint chamber is folded to form an airbag package and substantially maintains said package shape until it has passed the steering wheel rim. Therefore, it is one of the functions of the connecting chamber to convey the airbag package of the restraint chamber out of the exit opening of the airbag module, to deflect it by 90° and to move it through the clearance in the steering wheel rim. Moreover, the filled connecting chamber adopts the function of supporting the restraint chamber during initial deployment of the airbag package and maintaining the same in the desired position.

Of preference, the outer cover of the connecting chamber is made from exactly one cut part so as to facilitate fabrication.

The three-dimensional shape of the connecting chamber results from a suitable selection of the shape of the cut parts, wherein edge portions of the cut part or cut parts are appropriately interconnected.

One of the cut parts may have plural notches the lateral edges of which are interconnected, wherein the lateral edges which are not interconnected together form the edge of the inlet opening at which the connecting chamber is fastened to the inflation orifice of the restraint chamber. For example, there may be provided two, three or four notches to obtain the desired three-dimensional shape and, where necessary, the curvature of the connecting chamber.

Preferably, an inlet opening that is directly connected to a gas generator of the airbag module is disposed on the surface of one of the cut parts of the outer cover of the connecting chamber. This allows to place the inlet opening in a variable manner and, thus, permits ample scope for a three-dimensional shape of the restraint chamber.

The inlet opening and the inflation orifice are located, in the completely filled state of the connecting chamber and the restraint chamber, preferably in different planes and, in a top view, do not overlap the inflation orifice. This shape helps deflect the filling gas flow from the exit opening toward the inflation orifice, which, in turn, facilitates deflection and positioning of the restraint chamber.

The inflation orifice usually has a larger cross-sectional area than the inlet opening.

In a preferred variant, the connecting chamber is curved in arc shape in the filled state.

For example, in the completely filled state, the connecting chamber includes two mirror-inverted parallel curved lateral faces extending from the inlet opening to the inflation orifice. Thus, the shape of a curved duct is imparted to the connecting chamber, which has proven to be suitable with respect to the gas line and the positioning of the restraint chamber.

In the filled state of the airbag, the connecting chamber usually extends through the clearance and through the exit opening of the airbag module to the gas generator.

The clearance between the hub region and the steering wheel rim through which the airbag deploys is particularly disposed in the region of the 12 o'clock position.

Should the steering wheel rim be interrupted at the 12 o'clock position, the connecting chamber constitutes, even in the completely filled state of the airbag, an additional support for the restraint chamber in this region, where appropriate.

In order to achieve quicker filling of the airbag toward the 6 o'clock position, the inflation orifice of the restraint chamber may be arranged to be offset against a center of the centerline in the direction of the 12 o'clock position based on a straight-ahead travel position of the steering wheel and on an imaginary centerline of the restraint chamber extending from the 12 o'clock position to the 6 o'clock position. Said offset may amount, for example, to about 10% of the diameter of the restraint chamber along the centerline.

Moreover, the connecting chamber may include at least one vent opening which can be opened depending on the situation to allow the gas flow of filling gas out of the airbag, even before said filling gas reaches the restraint chamber.

According to another embodiment of the steering wheel, for forming the cushion-type restraint chamber a front wall and a rear wall are tightly interconnected on the peripheral edge side, wherein the two walls are further connected to each other, spaced from their edge-side tight connection, in the area of the 12 o'clock position by a detachable fixing portion, in particular wherein the detachable fixing portion is a circumferential seam portion in the form of a tear seam. Said detachable fixing portion initially impedes, after activation of the module, the deployment of the airbag in the area of the 12 o'clock position, thereby the occupant being strained to a lesser extent in the event of an unusual seating position (so-called "out-of-position" position).

Preferably, the circumferential seam portion in the form of a tear seam in this embodiment of the steering wheel extends at least between an 11 o'clock position and a 1 o'clock position. Moreover, the circumferential seam portion may be spaced at least 1.0 cm, particularly about 2.0 cm, from the edge-side tight connection of the two walls.

BRIEF DESCRIPTION OF THE DRAWINGS

In the following, the invention will be described in detail by way of plural embodiments with respect to the attached Figures, wherein:

FIG. 18 shows a schematic top view onto the airbag of the airbag module of the steering wheel from FIG. 1 in the flatly spread unfilled condition;

FIGS. 19 to 23 show cuttings of a connecting chamber of the airbag of the airbag module of the steering wheel from FIG. 1 in different embodiments;

FIGS. 26 to 47 schematically show the steps of a folding process of the airbag of the airbag module of the steering wheel from FIG. 1 in a first variant, in each case in a top view and a sectional view up to the completely folded airbag package;

DESCRIPTION

Figure 1:
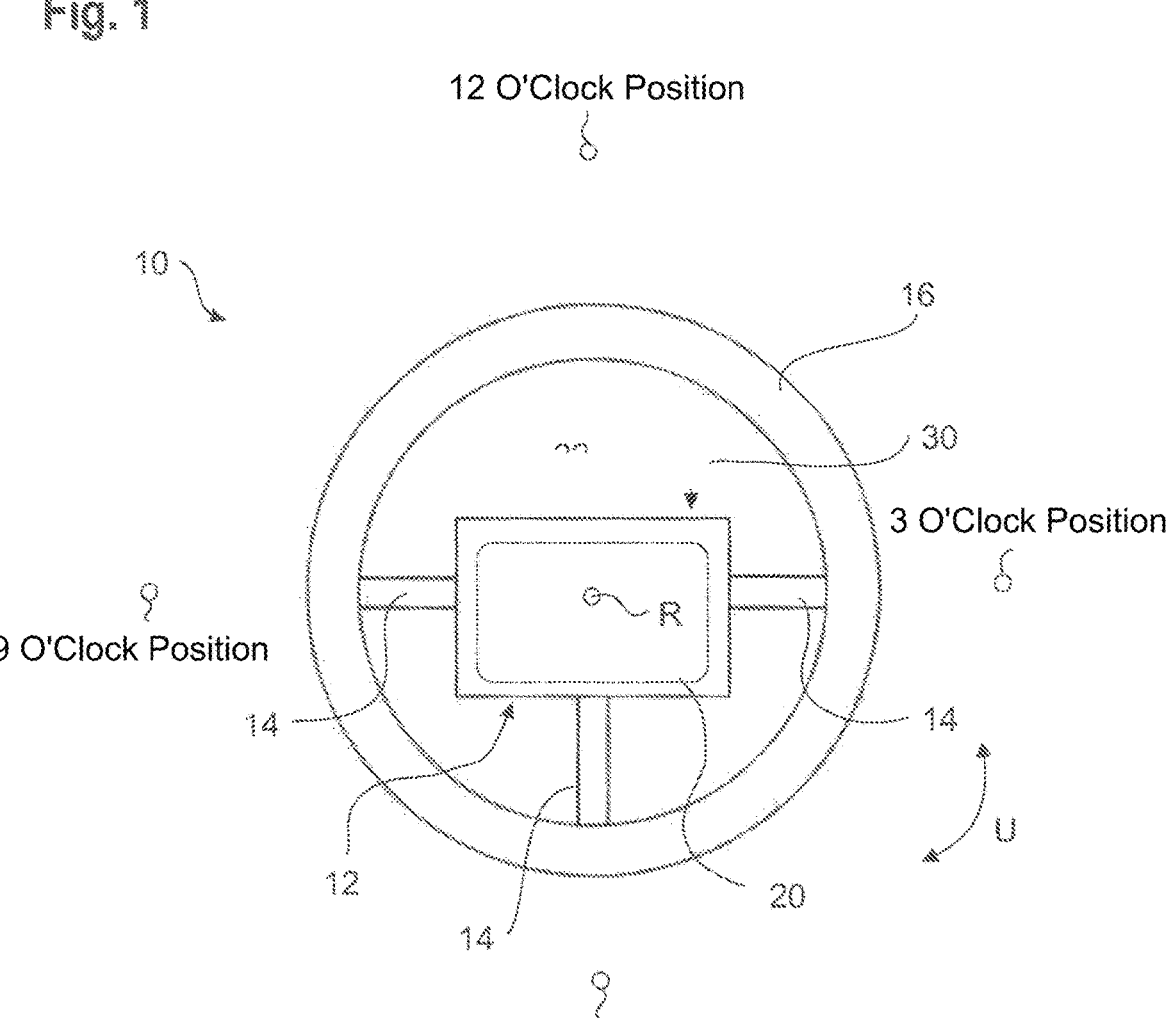
FIG. 1 shows a steering wheel according to the invention comprising an airbag module in a top view in the straight-ahead travel position prior to the deployment of the airbag.
Figure 2:
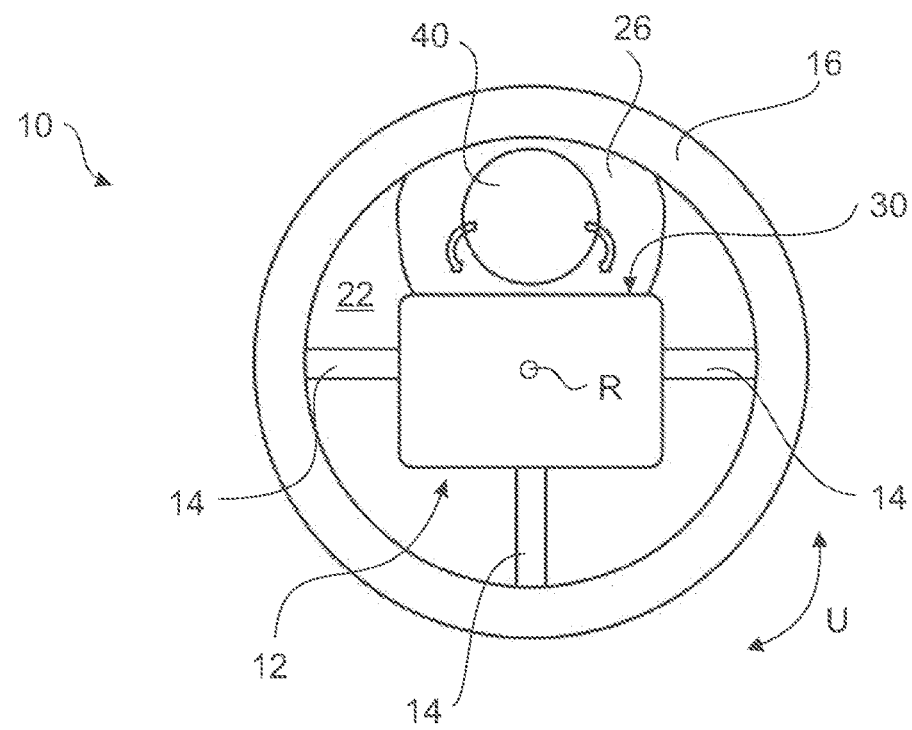
FIGS. 2 to 17 show the steering wheel from FIG. 1 during the deployment of the airbag up to the completely filled state of the airbag in a schematic view, in each case in a top view and an immediately following lateral view.

FIG. 1 shows a steering wheel 10 of a motor vehicle.

The steering wheel 10 is rotatable about an axis of rotation R extending through a hub region 12 in a circumferential direction U. The hub region 12 is connected to a steering wheel rim 16 via plural spokes 14. In this case, the steering wheel rim 16 in the conventional shape is circular and circumferentially closed. However, it might as well be interrupted in places according to different designs, such as in the area of a 12 o'clock position and/or in the area of a 6 o'clock position of the steering wheel 10.

In the Figures, the steering wheel 10 is always shown in its neutral straight-ahead travel position at which a 12 o'clock position is at the top in the Figures, a 6 o'clock position is at the bottom in the Figures, a 3 o'clock position is on the right and a 9 o'clock position is on the left (indicated in FIG. 1). All directional indications refer to said straight-ahead travel position.

Figure 3:
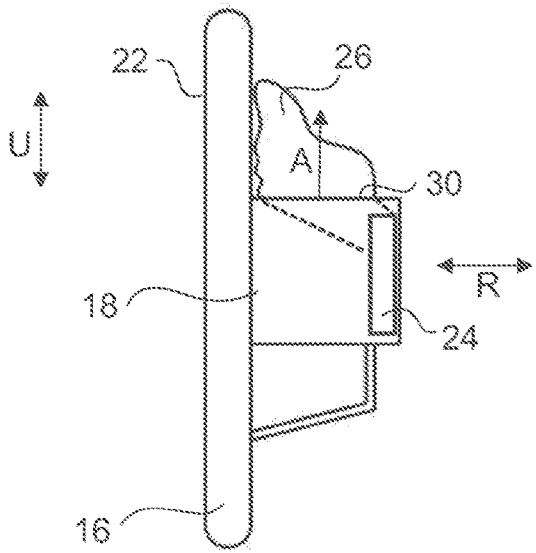

In the hub region 12, an airbag module 18 is arranged (indicated in FIG. 3, for example).

On the front side of the steering wheel 10, in the hub region 12 a display device 20 is placed, for example, as indicated in FIG. 1

A clearance 22 is formed in the area of the 12 o'clock position between the hub region 12 and the steering wheel rim 16.

Figure 47:
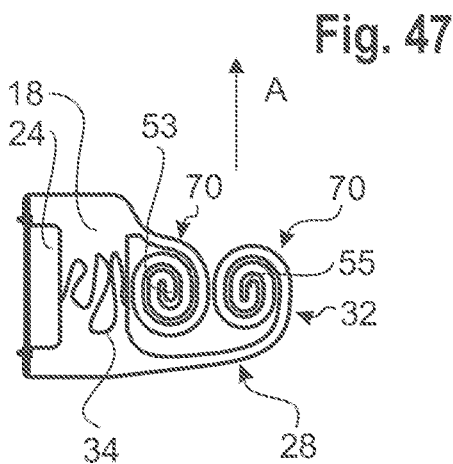
Figure 48:
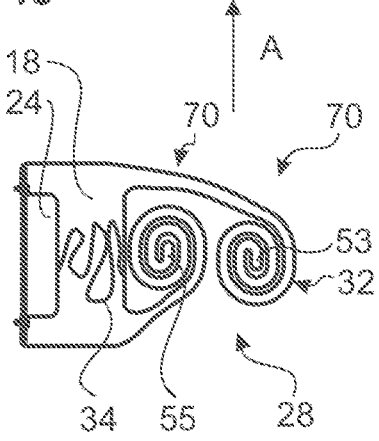
FIG. 48 shows a variant of the completely folded airbag package from FIG. 47.
Figure 49:
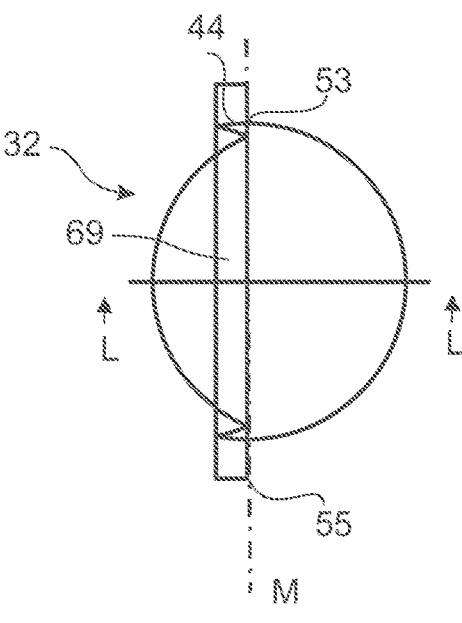
FIGS. 49 to 54 show an alternative for the first folding step of the folding process, in each case in a top view and a sectional view.
Figure 50:
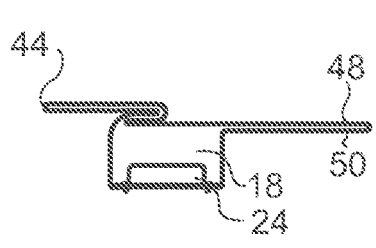
Figure 51:
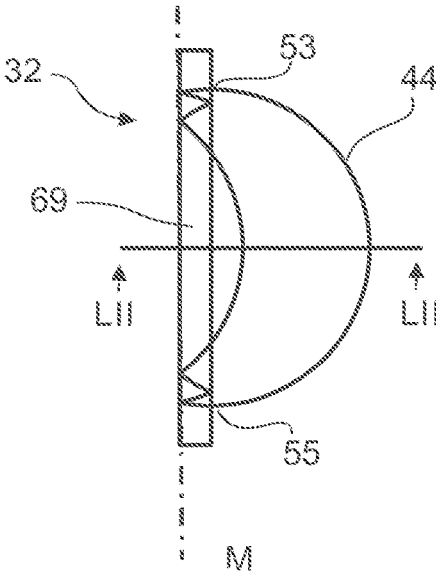
Figure 52:
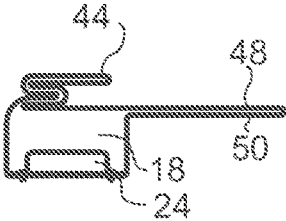
Figure 53:
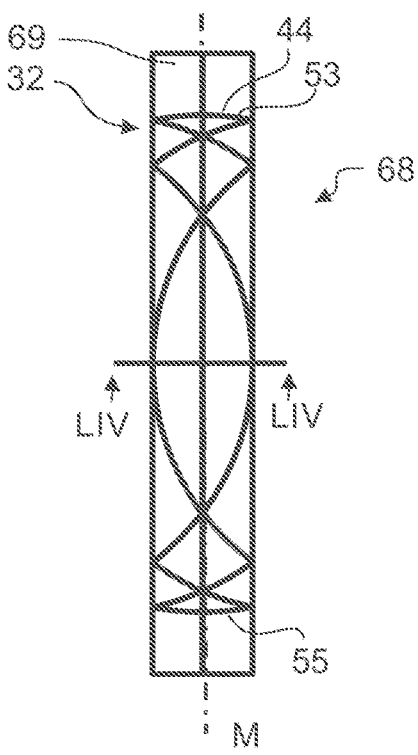
Figure 54:
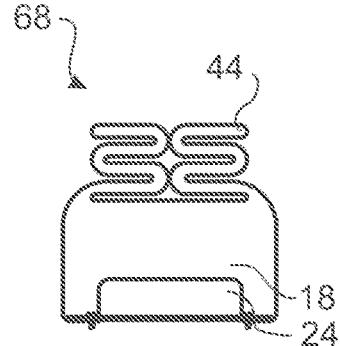

A gas generator 24 which in this case is mounted, as conventionally known, on the hub of the steering wheel 10 and an airbag 26 which is folded to form an airbag package 28 prior to activation of the airbag module 18 are accommodated in the airbag module 18 (see also FIGS. 47 and 48).

The airbag module 18 has an exit opening 30 which is closed by a door (not shown) and the surface normal of which is aligned approximately perpendicular to the axis of rotation R and, in this example, in the direction of the 12 o'clock position.

An exit direction A of the airbag 26 out of the airbag module 18 coincides with said surface normal so that the airbag 26 exits the airbag module 18 beneath the plane of the steering wheel rim 16. This is sketched in FIG. 3, for example.

Figures 24, 25:
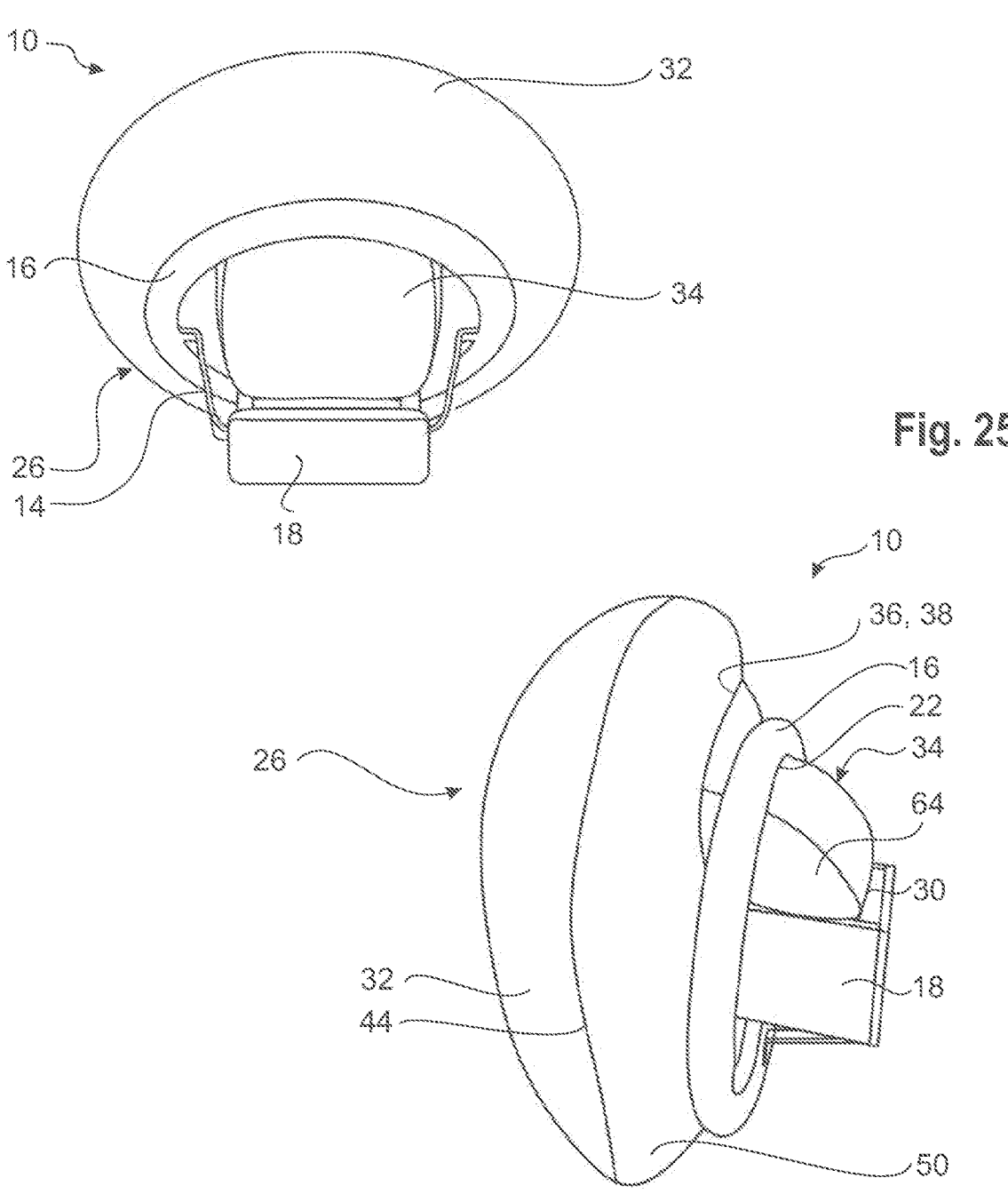
FIGS. 24 and 25 show schematic perspective views of the steering wheel from FIG. 1 from the rear side thereof, with the airbag being completely filled.
Figure 30:
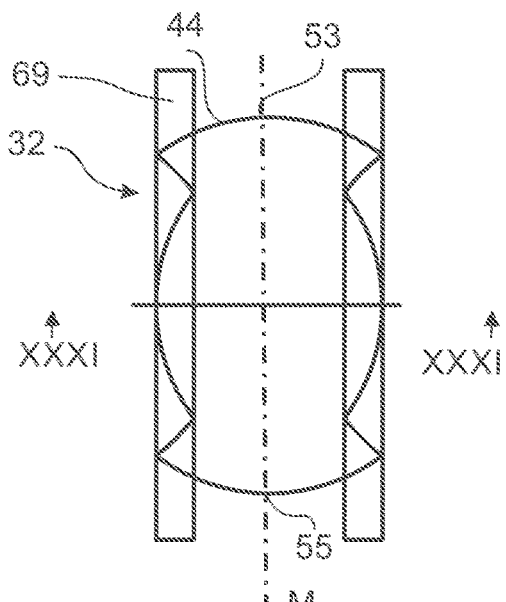
Figure 31:
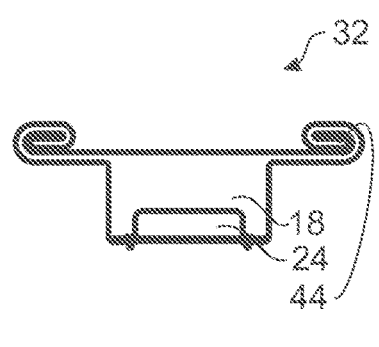
Figure 32:
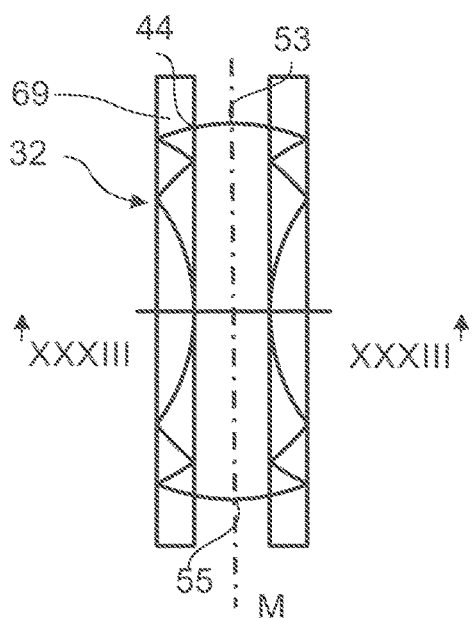
Figure 33:
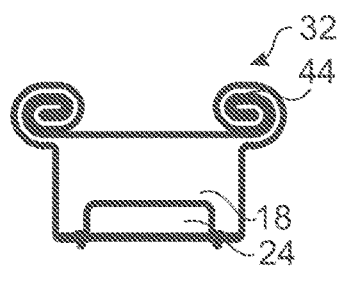
Figure 34:
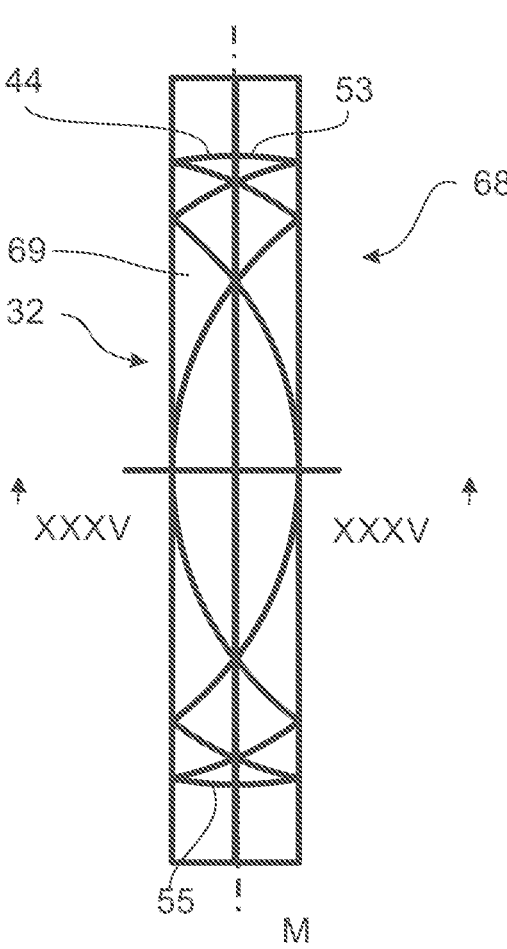
Figure 35:
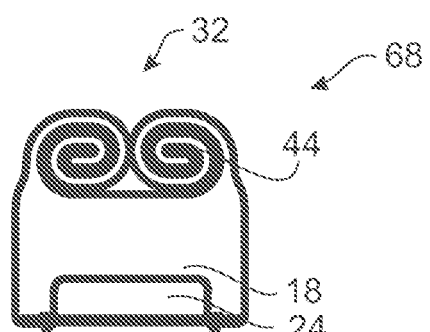
Figure 36:
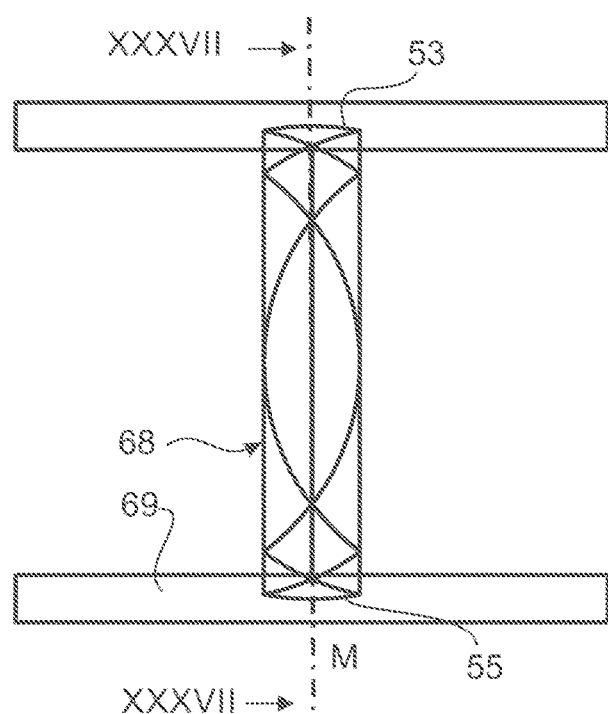
Figure 37:
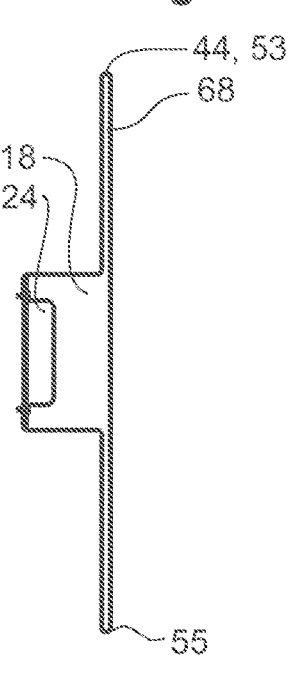
Figure 38:
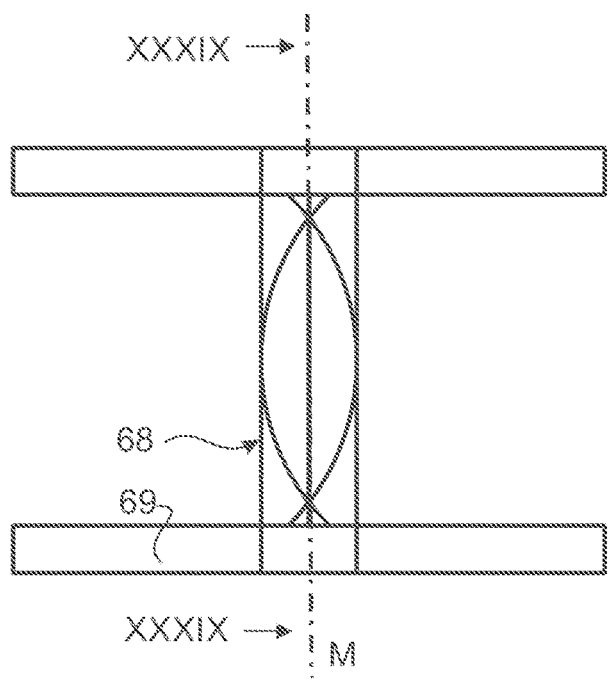
Figure 39:
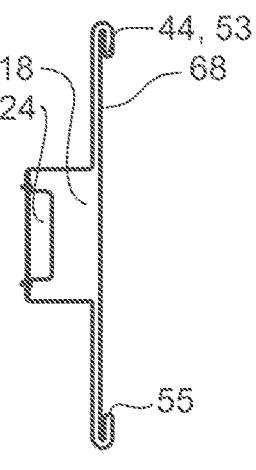
Figure 40:
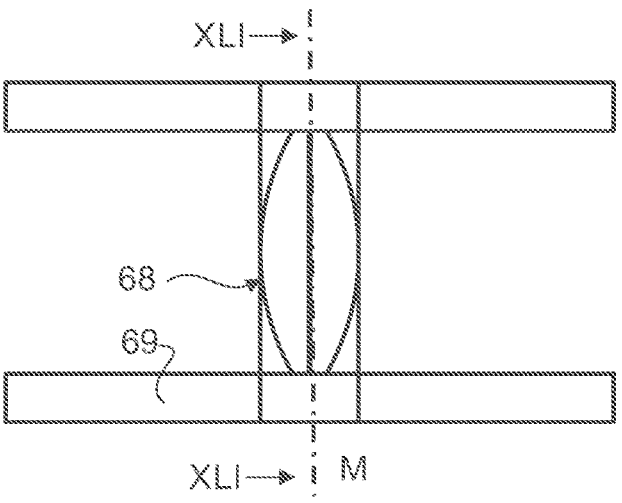
Figure 41:
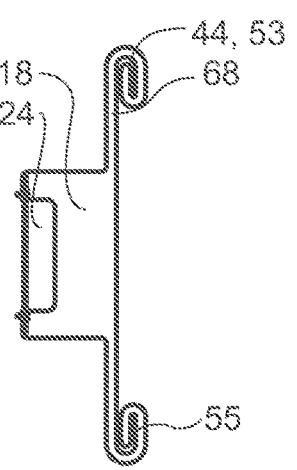
Figure 42:
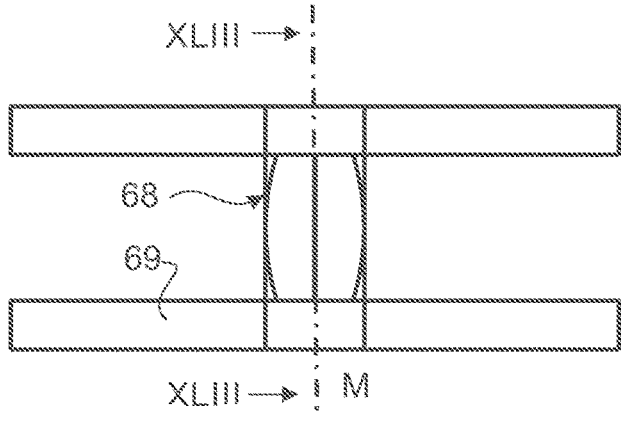
Figure 43:
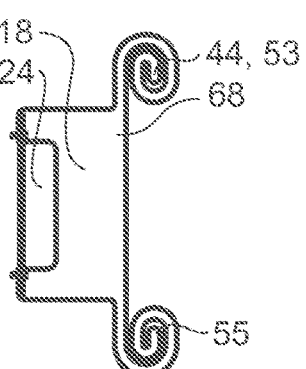
Figure 44:
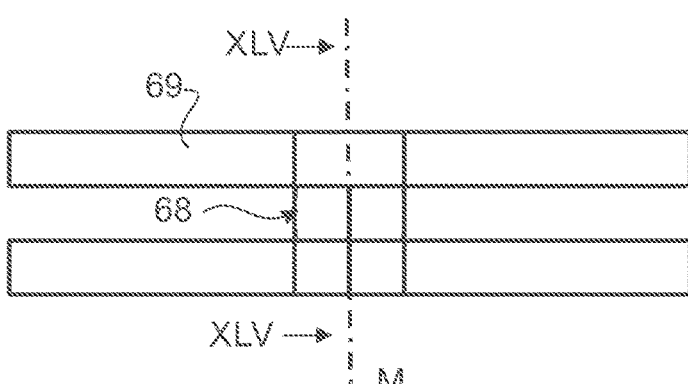
Figure 45:
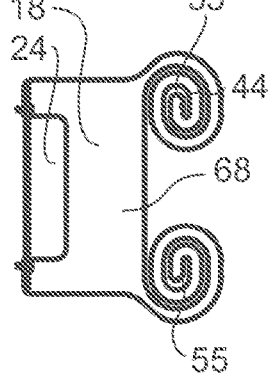
Figure 46:
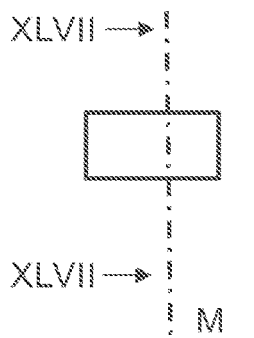

FIGS. 24 and 25 illustrate the steering wheel 10 with the completely filled airbag 26 in a rear view.

As is clearly visible from FIGS. 16, 17, 24 and 25, the airbag 26 consists of a cushion-type restraint chamber 32 and a curved connecting chamber 34 attached to the rear side thereof, the connecting chamber 34 connecting the restraint chamber 32 to the gas generator 24.

The connecting chamber 34 has a significantly smaller volume than the restraint chamber 32, for example less than 25% of the volume of the restraint chamber 32, and serves exclusively for positioning and supporting the restraint chamber 32, while the restraint chamber 32 provides the actual restraining effect for the vehicle occupant impacting on the airbag 26.

The connecting chamber 34 is attached, with a peripheral edge 36 of an inflation opening 37, to the edge 38 of an inflation orifice 40 of the restraint chamber 32 (see, e.g., FIGS. 18 and 25). From there the connecting chamber 34 extends into the airbag module 18 where the connecting chamber 34 is directly connected to the gas generator 24 via an inlet opening 42 (see, e.g., FIG. 19).

The restraint chamber 32 corresponds, as to its shape and its structure, to a conventional cushion-type steering wheel airbag. The contour of a peripheral edge 44 at the outer periphery of the restraint chamber 32 corresponds to the contour of the steering wheel rim 16 and, thus, is selected to be circular in this case. In the completely filled state, the peripheral edge 44 projects radially from the steering wheel rim 16.

In its initial state before the start of deployment, the restraint chamber 32 includes two tear seams 46 (see FIG. 18) which connect a front occupant-side wall 48 and a rear steering wheel-side wall 50 of the restraint chamber 32 to each other. FIG. 18 illustrates the restraint chamber 32 in a top view onto the front wall 48.

The two tear seams 46 restrict the initial filling volume of the airbag 26, more precisely of the restraint chamber 32, by suppressing or at least significantly reducing gas flow from the inflation orifice 40 into the edge-side portions between the tear seam 46 and the respective portion of the peripheral edge 44.

The two tear seams 46 extend in parallel to an imaginary centerline M of the restraint chamber 32 that extends from the 12 o'clock position to the 6 o'clock position so that gas flowing through the inflation orifice 40 into the restraint chamber 32 can spread toward the 12 o'clock position and toward the 6 o'clock position, but not toward the 3 o'clock position and toward the 9 o'clock position. Consequently, initially during inflation the airbag 26 is narrower than in the completely inflated condition.

The maximum distance d1 from the peripheral edge 44 amounts, e.g., to about 100 mm so that, for example, initially 10% to 20% of the total volume of the restraint chamber 32 are separated on each side. A diameter of the restraint chamber 32 from the peripheral edge 44 to the peripheral edge 44 amounts to 700 mm, for example.

At a first end 52 that is directed to the 12 o'clock position, in this case both tear seams 46 are guided up to the peripheral edge 44. At the opposite second end 54, however, a distance d2 from the peripheral edge 44 through which gas may overflow into the separated region is left open.

By the internal pressure building up, the tear seams 46 are gradually released in the course of filling so that, in the completely filled state of the airbag 26, the walls 48, 50 are still superimposed at the peripheral edge 44 only, but no longer in the area of the tear seams 46.

In this example, the tear seams 46 are configured by a thicker thread in the area of the second end 54 than in the area of the first end 52, or, generally speaking, the tear strength is higher at the second end 54 than at the first end 52. As a result, the tear seams 46 tear up more quickly toward the 12 o'clock position with increasing filling, because with an increasing internal pressure also the force acting upon the tear seams 46 is increased.

FIG. 18 also reveals that the inflation orifice 40 is displaced, relating to the centerline M, somewhat from a center MM toward the 12 o'clock position so that a center ME of the inflation orifice 40 is located between the center MM of the centerline M and the peripheral edge 44 at the 12 o'clock position. The displacement is about 10% of the diameter of the restraint chamber 32, for example.

Figures 16, 17:
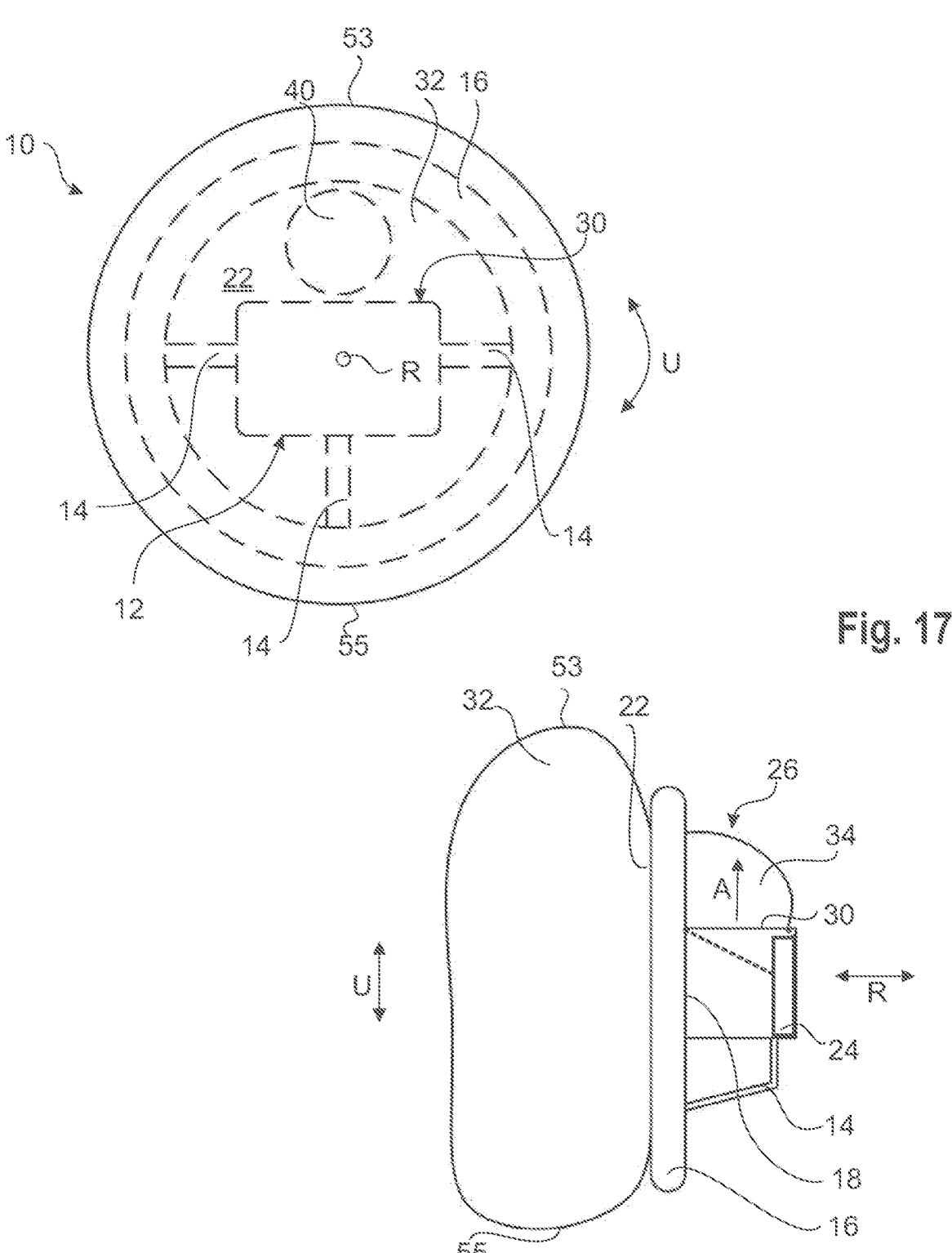

FIGS. 2 to 17 illustrate the deployment process of the airbag 26 up to the completely filled state (see FIGS. 16 and 17).

In conventional concepts, a steering wheel airbag deploys out of the upper side of an airbag module in the hub region of a steering wheel along the axis of rotation and is placed directly onto the steering wheel rim.

Since, in this case, the airbag 26 exits from the airbag module 18 beneath the plane of the steering wheel rim 16 at right angles to the axis of rotation R, but in the completely filled state the restraint chamber 32 is located, as usual, on the occupant side ahead of the steering wheel rim 16 and completely covers the latter, the restraint chamber 32 must pass the steering wheel rim 16 in the course of deployment.

Generally, this takes place by the airbag 26 passing through the clearance 22 between the hub region 12 and the steering wheel rim 16 and by the restraint chamber 32 deploying on the side of the steering wheel rim 16 facing the occupant.

Initially, after activation of the gas generator 24, at first gas flows into the connecting chamber 34, while the restraint chamber 32 folded to form the airbag package 28 still remains unfilled. The increasing gas pressure causes, on the one hand, the airbag module 18 to be opened and, on the other hand, the airbag package 28 to be pushed out of the airbag module 18 along the exit direction A.

By a shape of the connecting chamber 34 predetermined by the cutting thereof, the connecting chamber 34 bulges toward the steering wheel rim 16. After exiting through the exit opening 30, the airbag package 28 is deflected about 90° by the deploying and filling connecting chamber 34 and is pushed through the clearance 22 between the hub region 12 and the steering wheel rim 16.

Figure 4:
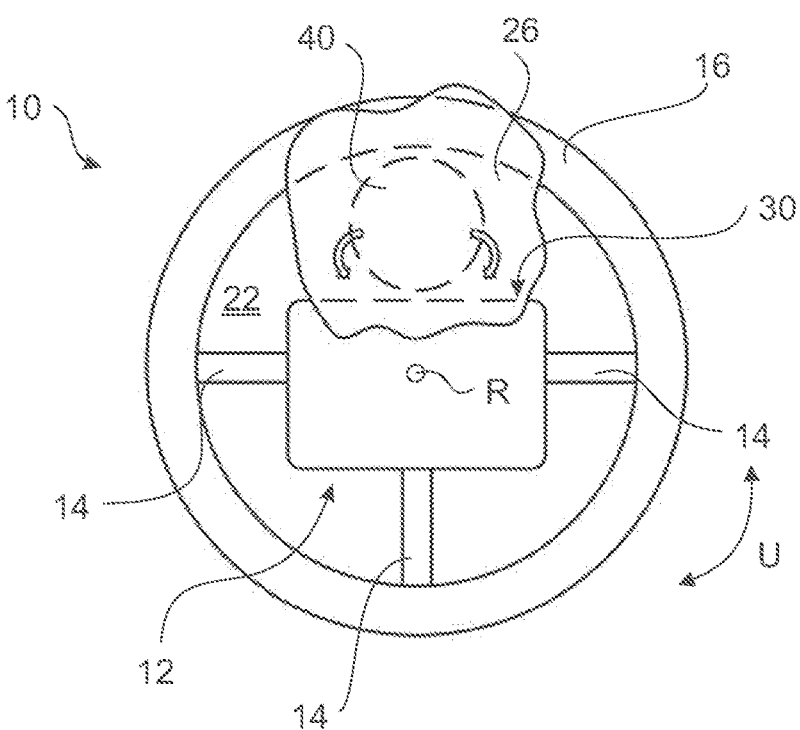
Figure 5:
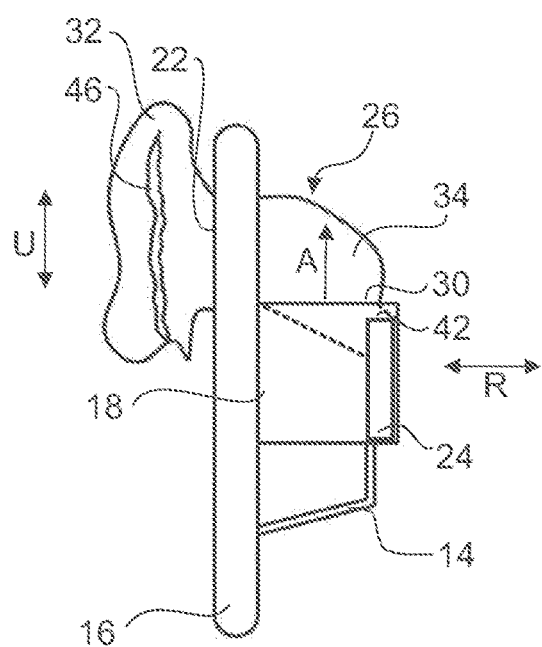

This state is illustrated in FIGS. 2 to 5, where it is also shown in FIGS. 4 and 5 already how the airbag package 28 starts to deploy after having passed the steering wheel rim 16.

The tear seams 46 are still intact at this time so that the filling gas flowing into the restraint chamber 32 flows virtually exclusively in the direction of the 12 o'clock position and of the 6 o'clock position and, thus, moves an upper edge 53 of the restraint chamber 32 toward the 12 o'clock position and moves a lower edge 55 of the restraint chamber 32 toward the 6 o'clock position.

Figure 6:
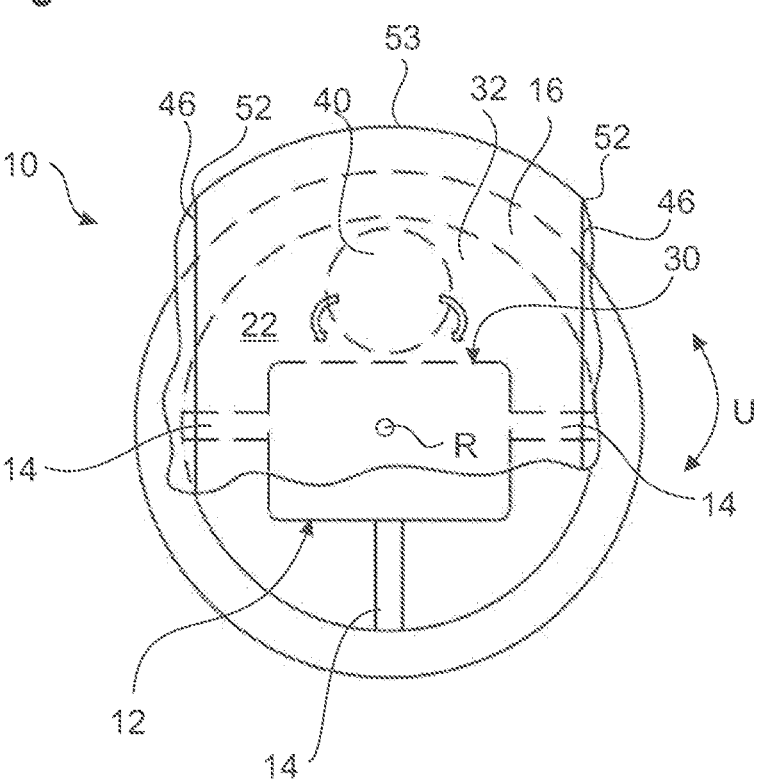
Figure 7:
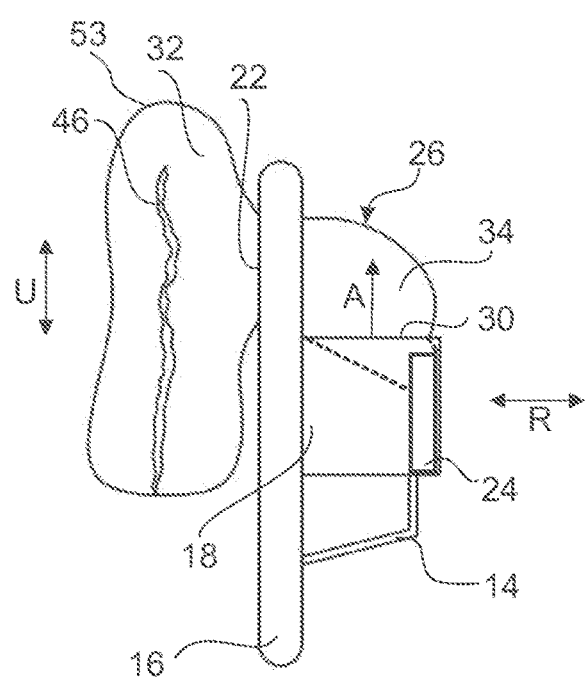
Figure 8:
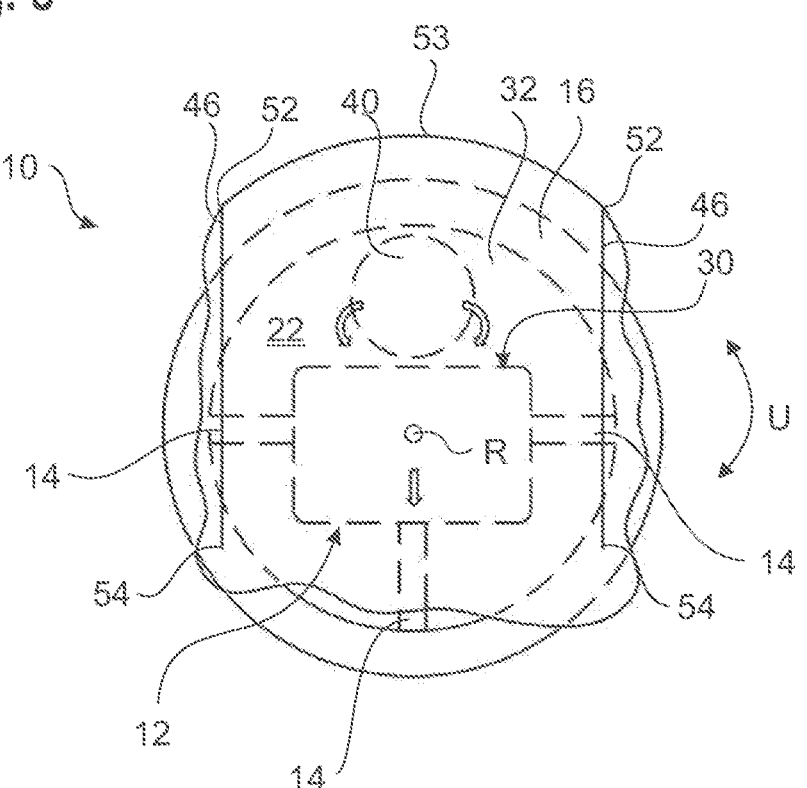
Figure 9:
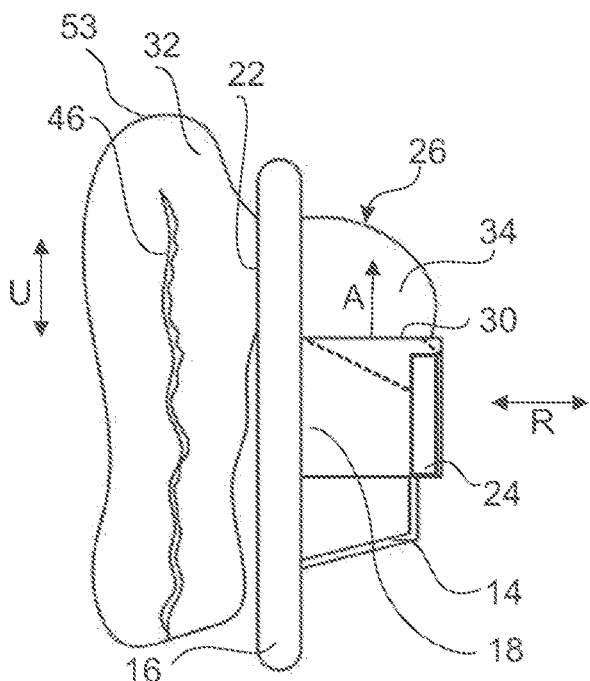
Figure 10:
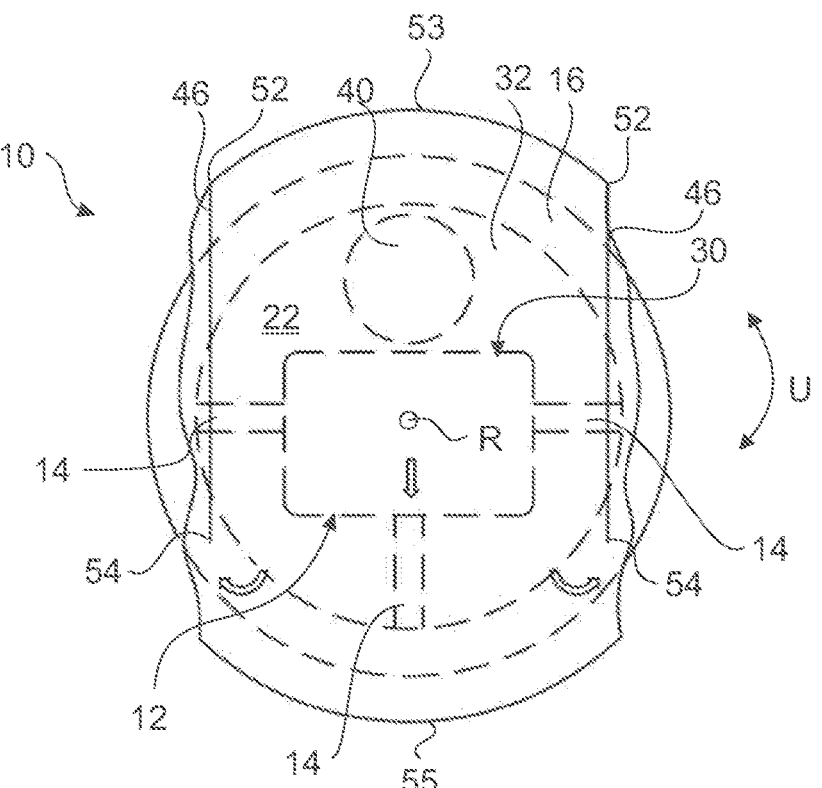
Figure 11:
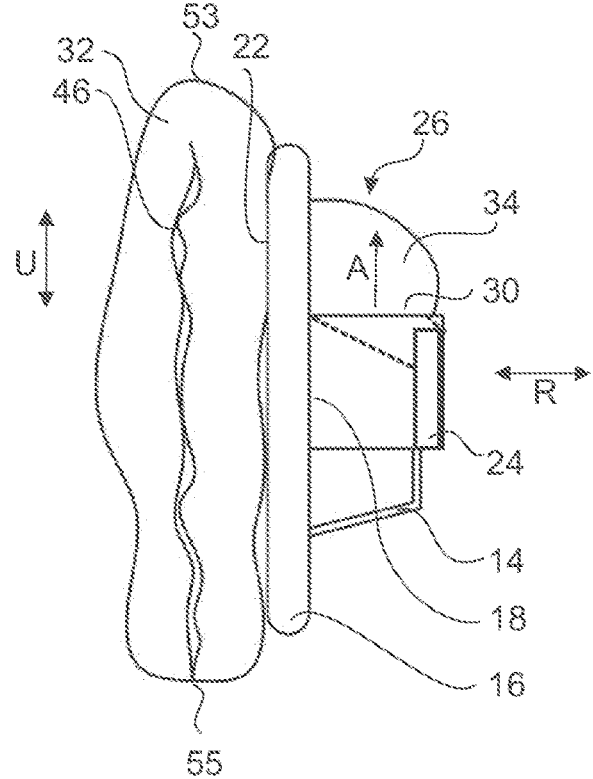
Figure 12:
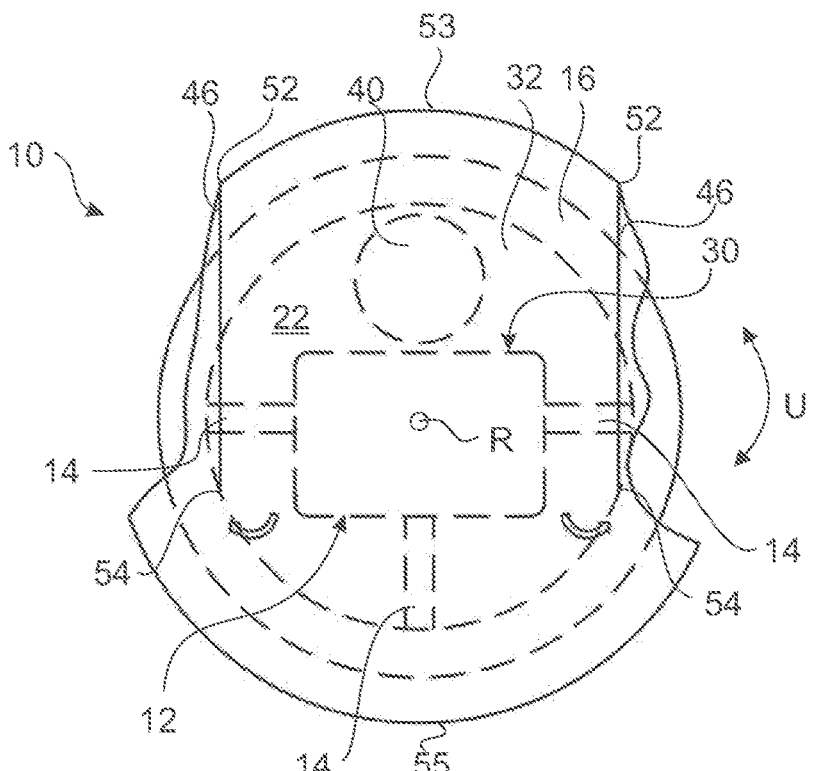
Figure 13:
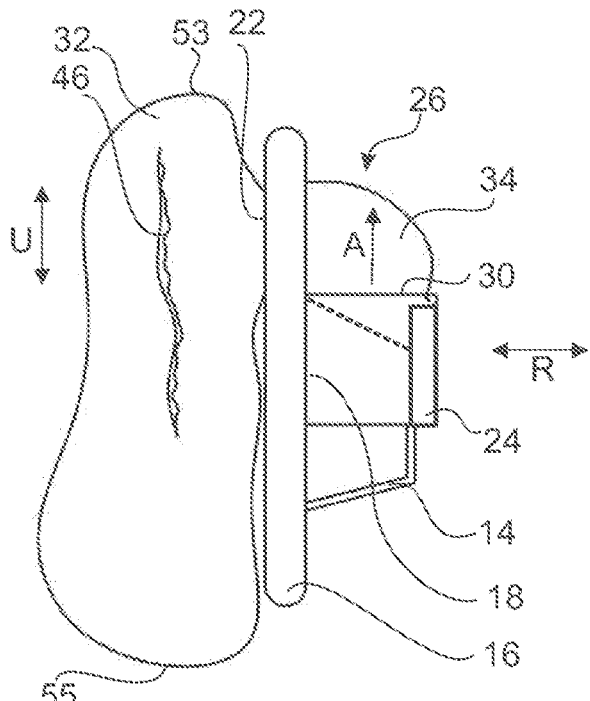
Figure 14:
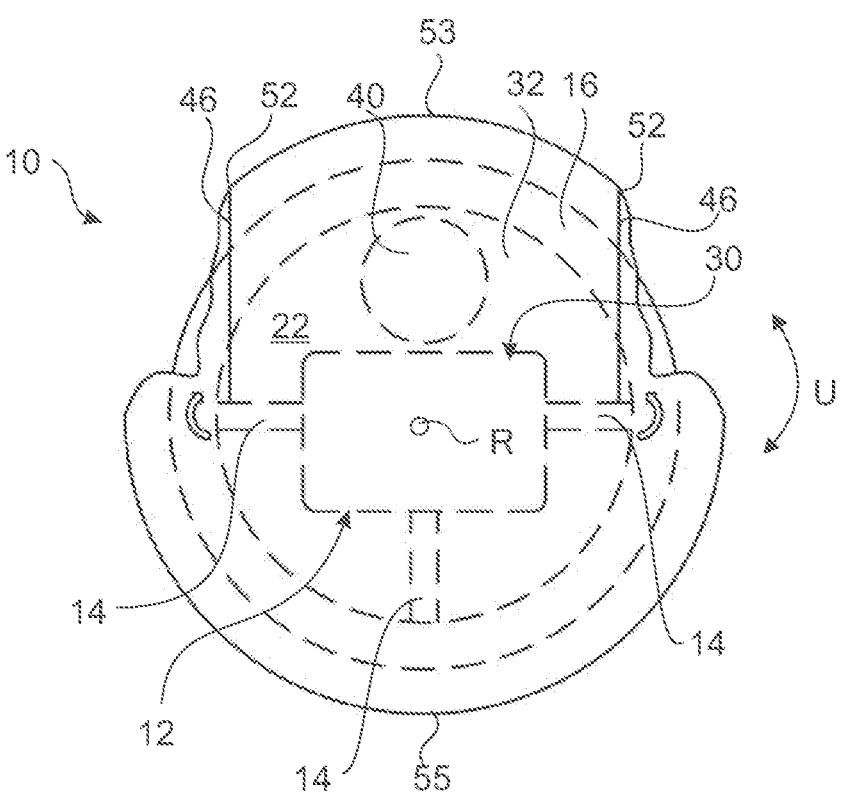
Figure 15:
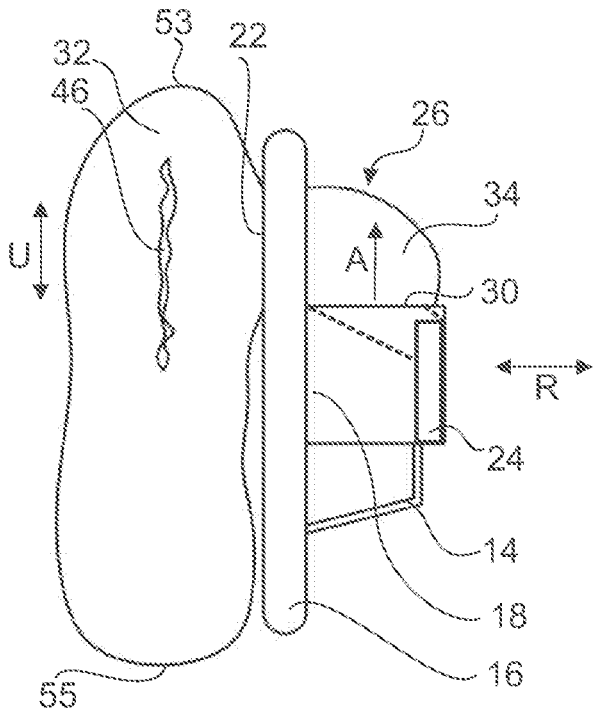

Since the inflation orifice 40 is closer to the 12 o'clock position than to the 6 o'clock position, and, where appropriate, this is considered in the folding of the airbag package 28 (as will be described below), in this example at first the upper region of the restraint chamber 32 fills, as is shown in FIGS. 6 and 7. Directly after that, the restraint chamber 32 deploys also in the direction of the 6 o'clock position, until the maximum expansion of the restraint chamber 32 is reached both in the 12 o'clock position and in the 6 o'clock position. This is illustrated in FIGS. 8 to 11. At this time, too, the two tear seams 46 are still substantially intact.

The continuously increasing internal pressure causes the tear seams 46 to be ripped from now starting from the second ends 54, and filling gas flows increasingly even into the lateral regions toward the 3 o'clock position and toward the 9 o'clock position. This is illustrated in FIGS. 12 to 15.

Finally, the filling process is completed and the airbag 26 is in its completely filled state. The tear seams 46 now are completely ripped (see FIGS. 16 and 17 as well as 24 and 25).

In the completely filled state, the peripheral edge 44 of the restraint chamber 32 is now located radially outside the steering wheel rim 16 over the complete periphery U thereof (see FIGS. 16, 17 and 24, 25).

The initial deployment process, in particular the positioning of the airbag package 28, is influenced by the shape of the connecting chamber 34.

FIGS. 19 to 23 illustrate variants for the cutting 56 of an outer cover, i.e., an outer surface, of the connecting chamber 34. All cuttings 56 have in common that they result in a three-dimensional shape of the connecting chamber 34 which is suited for forcing the airbag package 28 in its still folded state out of the airbag module 18 through the exit opening 30 and for deflecting the airbag package 28 from the exit direction A perpendicular to the axis of rotation R into the direction of the axis of rotation R. Further, the shape of the connecting chamber 34 causes the airbag package to be pushed through the clearance 22 and to be positioned and supported during deployment of the restraint chamber 32.

Additional guide members, particularly in the form of baffles provided in or on the airbag module 18 or on the door initially closing the exit opening 30 are not required.

Figure 21:
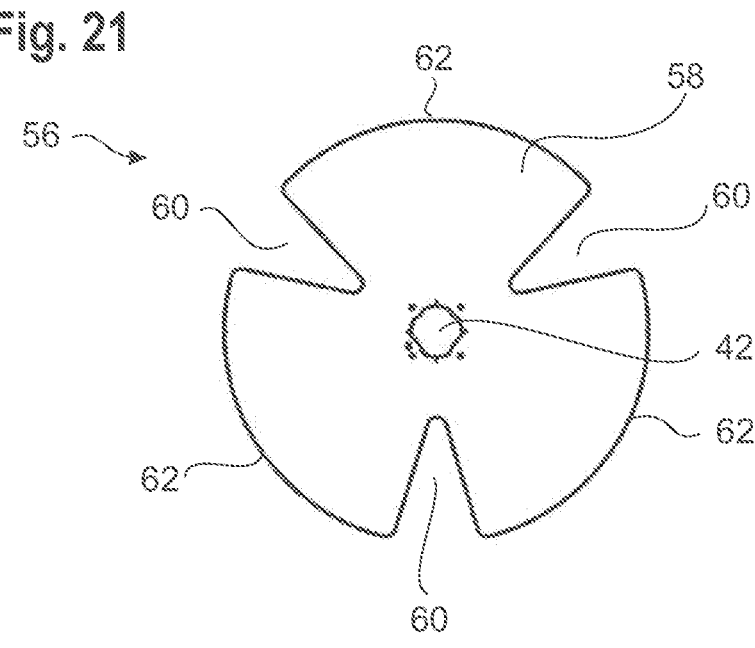

FIGS. 19, 20 and 21 illustrate cuttings 56 that are made of only one single cut part 58. The cut part 58 includes plural notches 60, four in each of the examples of FIGS. 19 and 20 and three in the example of FIG. 21. On the surface of the cut part 58, in each case one single inlet opening 42 is arranged which is connected to the gas generator 24, as above described. Accordingly, for example mounting holes which enable the connecting chamber 34 to be mounted directly on the gas generator 24 are distributed around the edge of the inlet opening 42.

In order to form the connecting chamber 34, the edges of the notches 60 which are directly juxtaposed are fastened to each other. The edge portions 62 which are then still free are now directly adjacent to each other and form the continuous peripheral edge 36 of the inflation opening 37 by which the connecting chamber 34 is attached to the inflation orifice 40 of the restraint chamber 32.

For the example of FIG. 19, the resulting three-dimensional shape of the connecting chamber 34 is illustrated in FIGS. 24 and 25. The two projecting "arms" 64 of the cut part 58 form, in the completely filled airbag 26, two parallel mirror-inverted curved lateral faces extending from the inlet opening 42 to the inflation orifice 40.

The remaining substantially rectangular cut part 58 forms a duct having an approximately constant cross-section so that, apart from proper gas guidance, also a proper supporting effect of the deploying restraint chamber 32 is achieved.

As, for example, also FIG. 18 illustrates, here the surface of the inlet opening 42 is significantly smaller than the surface of the inflation orifice 40.

Moreover, for the variant of FIG. 19, the inflation orifice 40 is offset against the inlet opening 42 along the centerline M so that said two openings do not overlap. This curved shape compels a deflection of the gas flow which, in turn, helps deflect and convey the airbag package 28 through the clearance 22 to the other side of the steering wheel rim 16.

The variant of the cutting 56 shown in FIG. 20 equally includes a one-piece cut part 58. When the edges of the notches 60 are interconnected, a curved funnel is resulting at the narrower end of which the inlet opening 42 is disposed, and the wider end of which forms the peripheral edge 36 of the inflation opening 37. As the inflation opening 42 is not disposed in the center of the cut part 58, in this case, too, an offset between the inflation orifice 40 and the inlet opening 42 and a deflection of the gas flow are resulting.

The variant illustrated in FIG. 21 results, by a one-piece cut part 58, in a funnel-shaped connecting chamber 34 in which the inlet opening 42 and the inflation orifice 40 are aligned in the airbag 26.

Figure 22:
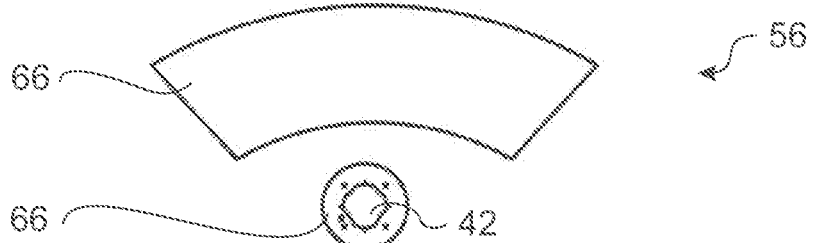

The variant illustrated in FIG. 22 results in a geometry similar to the one shown in FIG. 21, however with two separate cut parts 66.

Figure 23:
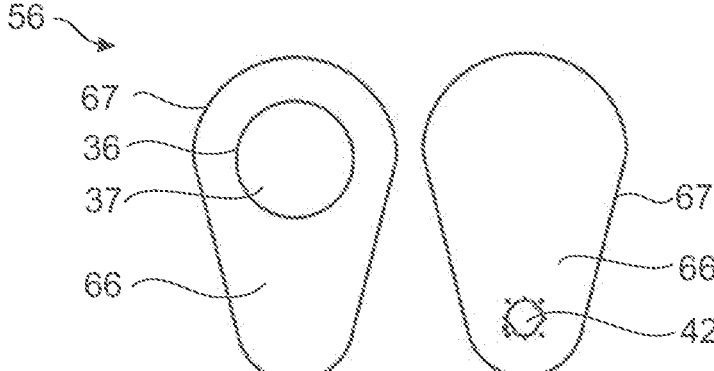

The variant illustrated in FIG. 23 results, with two separate cut parts 66, in a cushion-type connecting chamber 34, the inlet opening 42 being provided at one of the cut parts 66 and the inflation opening 37 being provided at the other of the cut parts 66. This example does not include any notches, but the two cut parts 66 are connected to each other at their peripheral edges 67. Since the inlet opening 42 and the inflation opening 37 are arranged to be offset in the two cut parts 66, also in this case a deflection of the gas flow occurs from the inlet opening 42 to the inflation orifice 40.

In all variants it is possible to provide a vent opening (not shown) which can be opened either passively or actively if required by the situation of restraint, in the cutting 56. This is the case, for example, if it is determined that the vehicle occupant is out of an optimum position and, therefore, the airbag 26 is to be filled with a smaller amount of filling gas only. In this case, any suitable mechanism for opening or closing the vent opening may be used.

The deployment of the restraint chamber 32 can also be influenced by the folding of the airbag 26 and, in particular, of the restraint chamber 32. Accordingly, the aim is always to obtain the quickest possible covering of the steering wheel rim 16 in the area of the 6 o'clock position.

FIGS. 26 to 56 illustrate a folding method for the restraint chamber 32 and possible variants.

From a flatly spread initial state (see FIGS. 26 and 27) each of the lateral areas of the restraint chamber 32 is rolled in toward the centerline M from the 3 o'clock position and the 9 o'clock position. A suitable folding tool 69 (see FIG. 28) is used to this end.

This first folding step is shown in FIGS. 28 to 35. As is visible in FIG. 35, the two rolled portions do not overlap.

The intermediate package 68 formed in this way (see FIG. 34) is now rolled, as shown in FIGS. 36 to 45, from each of the 12 o'clock position and the 6 o'clock position along the centerline M.

The separate partial packages 70 formed in this way are superimposed along the exit direction A, as illustrated in FIGS. 47 and 48. Accordingly, either the partial packages 70 (FIG. 47) or the portion of the restraint chamber 32 connecting the two partial packages 70 (FIG. 48) may be arranged to be directly adjacent to the exit opening 30.

FIGS. 47 and 48 also indicate that the connecting chamber 34 is folded in a random folding. As a result, the connecting chamber 34 is quickly filled upon activation of the gas generator 24 and starts to deploy already immediately upon the start of the filling, while the airbag package 28 comprising the folded restraint chamber 32 remains compact and virtually unfilled due to the double folding, until the airbag package 28 has passed through the clearance 22 between the hub region 12 and the steering wheel rim 16.

It is imaginable to additionally fix the airbag package 28, wherein the fixation includes a weakened zone that opens as soon as the airbag package 28 has passed through the steering wheel rim 16 (not shown).

Instead of the shown rolled folding, in the first folding step in which the lateral portions of the restraint chamber 32 are folded, also a Z folding (also referred to as zigzag folding) may be used, as shown in FIGS. 49 to 54.

Figure 55:
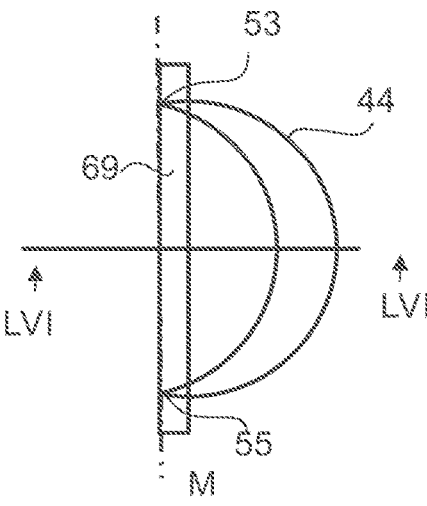
FIGS. 55 and 56 show another alternative for the first folding step of the folding process in a top view and a sectional view.
Figure 56:
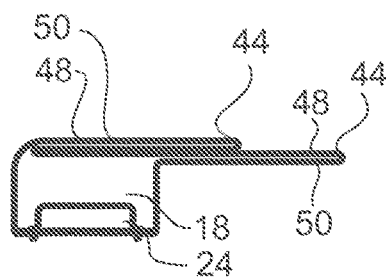
Figure 57:
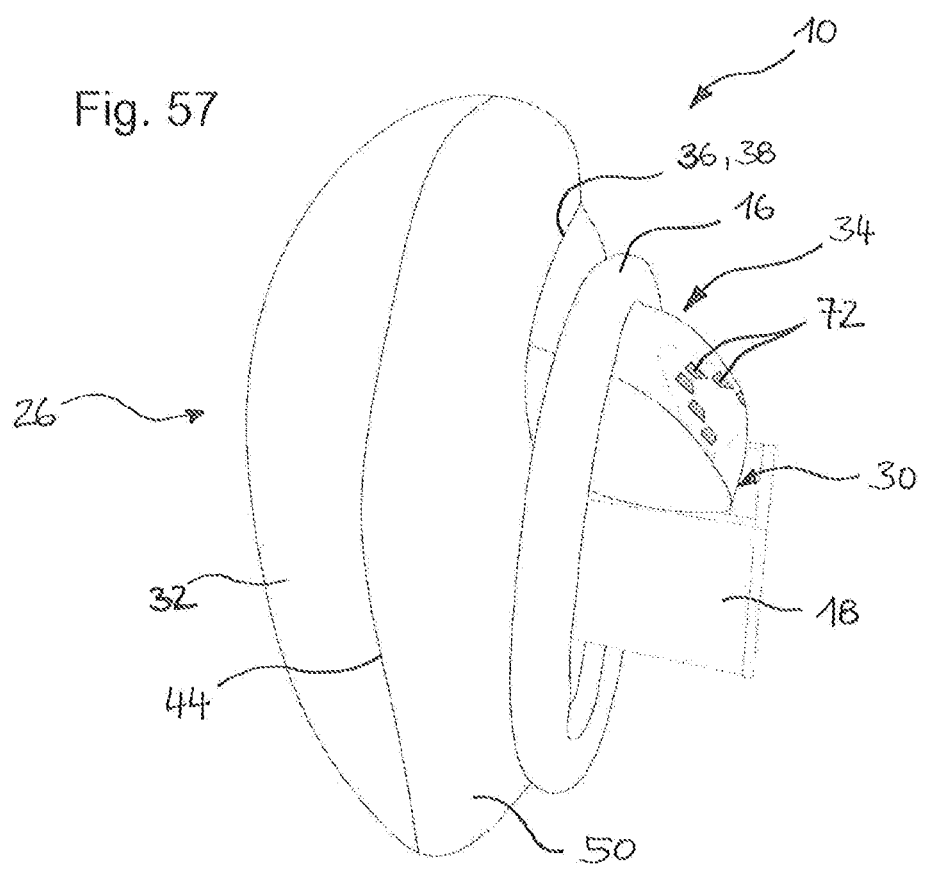
FIG. 57 shows the schematic perspective view of the steering wheel of FIG. 25 with a filled airbag according to an alternative variant.

It would be equally possible, as illustrated in FIGS. 55 and 56, to fold, in the first folding step, initially one half of the restraint chamber 32 into the interior of the other half so that the restraint chamber 32 at first adopts a semicircular shape, and then to fold or roll the latter from the 3 o'clock position.

In all variants, subsequently the resulting intermediate package 68 is rolled from the two ends or is folded in a Z folding.

Of course, basically any suitable combination of different methods such as rolling and Z folding may also be carried out.

Due to the folding in which the lateral portions of the restraint chamber 32 are folded in the intermediate package 68 as well as due to the separate folding of the upper and lower portions of the restraint chamber 32 in the partial packages 70, the airbag package 28 deploys at first in the direction of the 12 o'clock position and of the 6 o'clock position and only subsequently in the direction of the 3 o'clock position and of the 9 o'clock position.

This is also supported by the tear seams 46 (see FIG. 18) which largely prevent the lateral portions from being filled, until the restraint chamber 32 is completely deployed in the direction of the 12 o'clock position and of the 6 o'clock position.

The connecting chamber 34 ensures the correct positioning of the airbag package 28 prior to deployment thereof above the steering wheel rim 16.

However, it is also possible to make use of the tear seams 46 with a different folding method or to use the described folding methods in a restraint chamber 32 which does not include any tear seams 46. Likewise, in all cases, connecting chambers 34 as afore-described, but also different types of connecting chambers between the restraint chamber 32 and the gas generator 24 can be used.

FIGS. 57 to 61 illustrate another configuration variant of the steering wheel 10 in which the connecting chamber 34 of the airbag 26 has at least one vent opening 72 to allow filling gas to flow out of the airbag 26 even before it reaches the restraint chamber 32. The at least one vent opening 72 for the outflow of filling gas is disposed beneath the steering wheel rim 16, i.e., on a side of the steering wheel rim 16 remote from the vehicle occupant 73 (see FIGS. 57 and 60).

Figure 58:
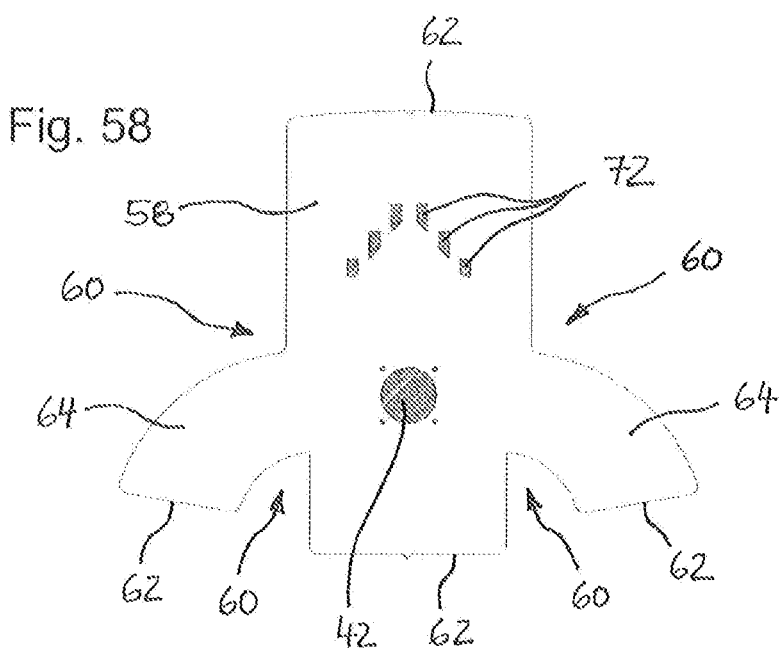
FIG. 58 shows a cutting of the connecting chamber of the airbag for the steering wheel according to FIG. 57.

The one-piece cut part 58 for the connecting chamber 34 substantially corresponds to the cut part 58 described before based on FIG. 19, the cut part 58 additionally including, according to FIG. 58, the at least one vent opening 72.

Figure 59:
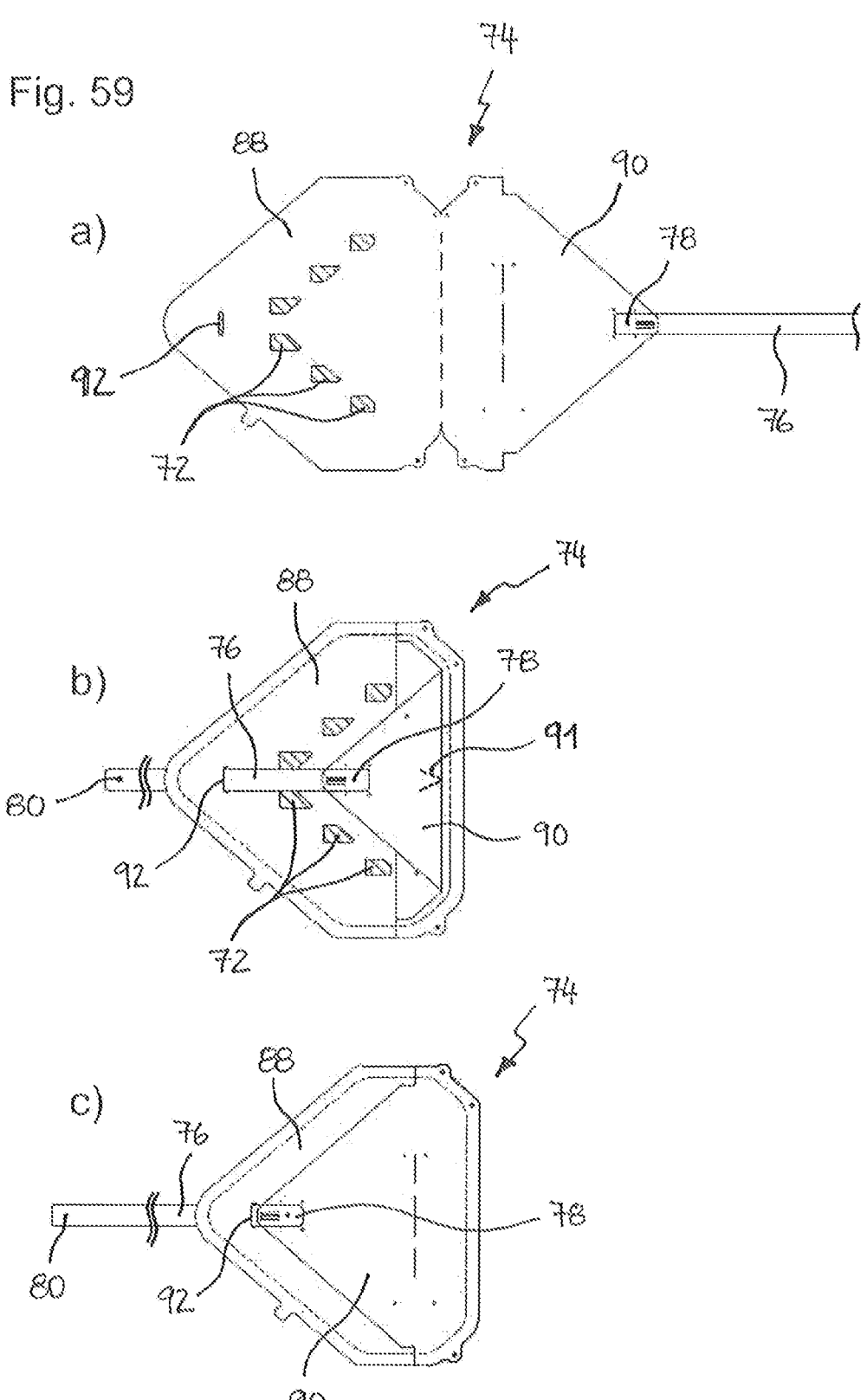
FIG. 59 shows a closure element of the airbag for the steering wheel according to FIG. 57 in a deployed position of the cutting as well as a release position and a closing position of the vent openings.

In FIG. 59, a closure element 74 for closing the at least one vent opening 72 is shown, said closure element 74 being disposed on an inner face of the connecting chamber 34 and being connected to the cut part 58.

FIG. 59 *a*) illustrates the cutting of the closure element 74 in the unfolded state. The closure element 74 includes a fastening portion 88 and a closing portion 90. The fastening portion 88 has, just as the cut part 58, the at least one vent opening 72 and is fastened, particularly stitched, to the cut part 58 such that the vent openings 72 are superimposed. The closing portion 90 is not connected to the cut part 58 and is folded in an initial position and fixed to the fastening portion 88 such that the vent openings 72 are released (FIG. 59 *b*)). For fixation in its initial position, the closing portion 90 is detachably stitched to the fastening portion 88 by a tear seam 91, for example.

As illustrated in FIG. 59, a tether 76 is further provided which is connected at one tether end 76 to the closure element 74, particularly to the closing portion 90 of the closure element 74. The tether 76 is threaded through a guide opening 92 in the fastening portion 88 of the closure element 74 and is fastened, at an opposite tether end 80, to a wall 48, 50 of the airbag 26, in particular to the front wall 48 of the restraint chamber 32, as indicated in FIGS. 60 and 61.

Figure 60:
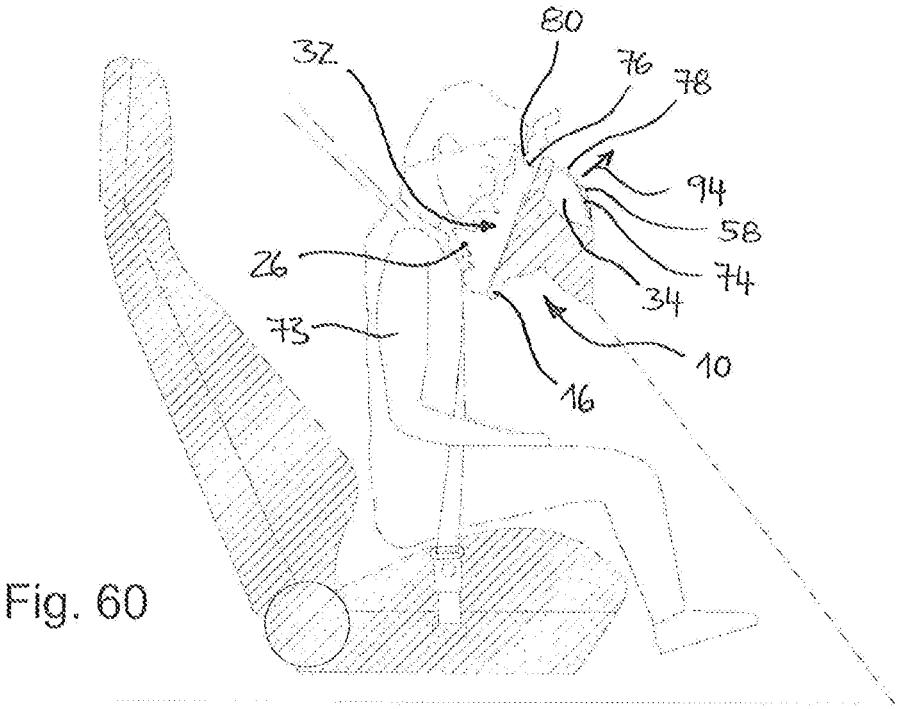
FIG. 60 shows a schematic lateral view of the steering wheel according to FIG. 57 in a release position of the vent openings; und

In a so-called "out-of-position" position of a vehicle occupant 73 according to FIG. 60, i.e., an unusual seating position close to the steering wheel 10, the airbag 26 cannot freely deploy so that the tether 76 is not tensioned and the closing portion 90 of the closure element 74 remains in its initial position according to FIG. 59 *b*). Accordingly, the vent openings 72 are released so that filling gas can flow out (arrow 94) and the airbag 26 deploys toward the vehicle occupant 73 in a less aggressive manner.

Figure 61:
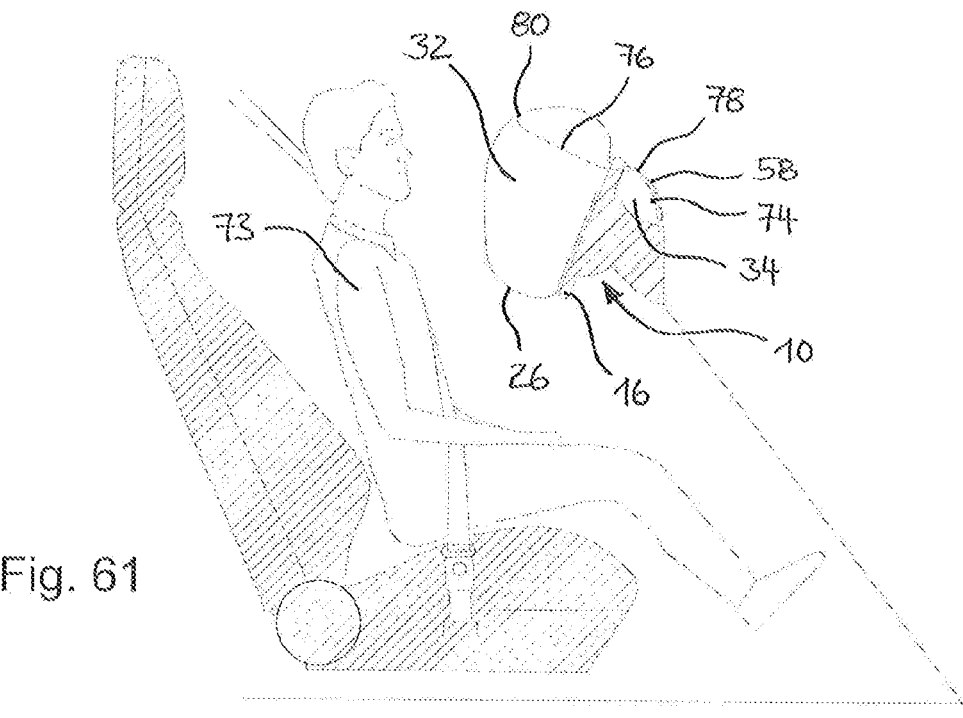
FIG. 61 shows a schematic lateral view of the steering wheel according to FIG. 57 in a closing position of the vent openings.

In a usual seating position of the vehicle occupant 73 according to FIG. 61, on the other hand, the airbag 26 can deploy freely, causing the tether 76 to be tensioned and the tear seam 91 to tear up. Due to the tensile force within the tether 76, the closure element 74 is pulled from the initial position according to FIG. 59 *b*) to a closing position according to FIG. 59 *c*) in which the vent openings 72 are covered by the closing portion 90 and are thus closed. Accordingly, the filling gas cannot flow out of the airbag 26 any more and is advantageously utilized to quickly and completely deploy the airbag.

Guiding of the tether 76 in the guide hole 92 of the fastening portion 88 ensures that the closing portion 90 remains very closely to the vent openings 72 of the fastening portion 88, when it moves from the initial position to the closing position, and closes the vent openings 72 in an approximately tight manner.

For forming the cushion-type restraint chamber 32, the front wall 48 and the rear wall 50 are tightly connected to each other on the peripheral edge side, such as by a circumferential seam. As indicated in FIG. 18, the two walls 48, 50 can be further connected to each other, spaced from their edge-side tight connection 82, in the area of the 12 o'clock position by a detachable fixing portion 84, the detachable fixing portion 84 being specifically a circumferential seam portion 86 in the form of a tear seam. In this way, an airbag deployment is at least delayed in the area of the 12 o'clock position to further reduce any strain on the vehicle occupant 73 in the event of an unusual seating position close to the steering wheel 10.

The circumferential seam portion 86 extends at least between an 11 o'clock position and a 1 o'clock position and, in FIG. 18, concretely between the two lateral tear seams 46 of the cushion-type restraint chamber 32 of the airbag 26, wherein the ends of the circumferential wall portion 86 are preferably slightly spaced from the lateral tear seams 46 so as not to influence the respective tearing behavior. In the shown embodiment, the circumferential seam portion 86 is spaced at least 1.0 cm, in particular about 2.0 cm, from the edge-side tight connection 82 of the two walls 48, 50.

The invention claimed is:

1. A steering wheel comprising
   a steering wheel rim and an airbag module accommodated in a hub region of the steering wheel and comprising an airbag,
   wherein an exit opening of the airbag module is located at a position different from an upper side of the steering wheel and beneath the steering wheel rim, and the airbag module is disposed so that the airbag deploys through a clearance between the hub region and the steering wheel rim toward the upper side of the steering wheel,
   wherein the airbag comprises a restraint chamber and a connecting chamber, and the restraint chamber, in a completely filled state, covers the steering wheel rim on an occupant side, while the connecting chamber connects the restraint chamber via an inflation orifice disposed on a rear wall of the restraint chamber to a gas generator accommodated in the airbag module,
   wherein the connecting chamber of the airbag includes at least one vent opening to allow filling gas to flow out of the airbag before the filling gas reaches the restraint chamber.

2. The steering wheel according to claim 1, wherein the at least one vent opening for the outflow of filling gas is disposed behind the steering wheel rim.

3. The steering wheel according to claim 1, wherein the connecting chamber includes a closure element for closing the at least one vent opening.

4. The steering wheel according to claim 3, wherein a tether is provided which at one tether end is connected to the closure element and at an opposite tether end is connected to a wall of the airbag.

5. The steering wheel according to claim 4, wherein the opposite tether end is connected to a front wall of the restraint chamber.

6. The steering wheel according to claim 1, wherein the connecting chamber in the filled state takes a tubular shape that is predetermined by at least one cut part of an outer cover of the connecting chamber.

7. The steering wheel according to claim 6, wherein the outer cover of the connecting chamber is made from cut parts adapted to be flatly spread, wherein there are a maximum of two cut parts.

8. The steering wheel according to claim 6, wherein the outer cover of the connecting chamber is made from exactly one cut part.

9. The steering wheel according to claim 6, wherein one of the at least one cut part has plural notches having lateral edges which are interconnected, and lateral edges which are not interconnected, wherein the lateral edges that are not interconnected together form an edge of an inflation opening at which the connecting chamber is fastened to the inflation orifice of the restraint chamber.

10. The steering wheel according to claim 6, wherein an inlet opening that is directly connected to the gas generator of the airbag module is disposed on a surface of one of the at least one cut part of the outer cover of the connecting chamber.

11. The steering wheel according to claim 10, wherein the inlet opening and the inflation orifice, in the filled state of the connecting chamber and of the restraint chamber, are located in different planes and, in a top view onto the inflation orifice, do not overlap.

12. The steering wheel according to claim 10, wherein the inflation orifice has a larger cross-sectional area than the inlet opening.

13. The steering wheel according to claim 10, wherein the connecting chamber in the filled state has two mirror-inverted parallel curved lateral faces extending from the inlet opening to the inflation orifice.

14. The steering wheel according to claim 1, wherein, in the filled state of the airbag, the connecting chamber extends through the clearance and through the exit opening of the airbag module to the gas generator.

15. The steering wheel according to claim 1, wherein a centerline extends from a 12 o'clock position of the steering wheel to a 6 o'clock position of the steering wheel based on a straight-ahead travel position of the steering wheel, and wherein the inflation orifice is offset against a center of the centerline in the direction of the 12 o'clock position.

16. The steering wheel according to claim 1, wherein, for forming the restraint chamber, a front wall is tightly connected to the rear wall on a peripheral edge-side, wherein the front and rear walls are further connected to each other, spaced from their edge-side tight connection, in an area of a 12 o'clock position by a detachable fixing portion.

17. The steering wheel according to claim 16, wherein the detachable fixing portion is a circumferential seam portion in the form of a tear seam.

* * * * *